United States Patent
Marrow et al.

(10) Patent No.: US 7,805,731 B2
(45) Date of Patent: Sep. 28, 2010

(54) DISTRIBUTED PROCESSING MANAGEMENT FOR DE-CENTRALIZED INFORMATION ECOSYSTEM TECHNOLOGIES (DIET)

(75) Inventors: Paul Marrow, Ipswich (GB); Erwin R Bonsma, Ipswich (GB); Cefn R Hoile, Ipswich (GB); Fang Wang, Ipswich (GB)

(73) Assignee: British Telecommunications plc, London (GB)

( * ) Notice: Subject to any disclaimer, the term of this patent is extended or adjusted under 35 U.S.C. 154(b) by 1374 days.

(21) Appl. No.: 10/468,768

(22) PCT Filed: Mar. 1, 2002

(86) PCT No.: PCT/GB02/00899

§ 371 (c)(1),
(2), (4) Date: Aug. 21, 2003

(87) PCT Pub. No.: WO02/071217

PCT Pub. Date: Sep. 12, 2002

(65) Prior Publication Data

US 2004/0078420 A1    Apr. 22, 2004

(30) Foreign Application Priority Data

Mar. 1, 2001 (EP) .................. 01301885
Mar. 20, 2001 (GB) .................. 0106957.4
Mar. 21, 2001 (GB) .................. 01302606.7
Nov. 29, 2001 (GB) .................. 0128637.6

(51) Int. Cl.
*G06F 15/16* (2006.01)
*G06F 9/54* (2006.01)

(52) U.S. Cl. ............... 719/317; 719/313; 719/330; 709/202

(58) Field of Classification Search ............ 719/313, 719/317, 330; 709/202
See application file for complete search history.

(56) References Cited

U.S. PATENT DOCUMENTS

| 6,065,039 | A  | * | 5/2000  | Paciorek ........... 709/202 |
| 6,163,794 | A  | * | 12/2000 | Lange et al. ....... 709/202 |
| 6,363,411 | B1 | * | 3/2002  | Dugan et al. ....... 709/202 |
| 6,496,871 | B1 | * | 12/2002 | Jagannathan et al. ... 719/317 |
| 6,678,743 | B1 | * | 1/2004  | Glass et al. ....... 719/317 |

(Continued)

FOREIGN PATENT DOCUMENTS

EP    0915417 A2    5/1999

OTHER PUBLICATIONS

Mitsuru Oshima and Guenter Karjoth, "Aglets Specification (1.0)," May 20, 1997, pp. 1-28.*

(Continued)

*Primary Examiner*—Li B Zhen
(74) *Attorney, Agent, or Firm*—Nixon & Vanderhye PC

(57) ABSTRACT

A system for distributed process management uses a plurality of units of software installed on a computing platform. Further software controls operation of the plurality of units in use. Each unit of software communicates with other units of software, and at least some of the units of software further provides one or more elements of a software process. The further software being capable of defining at least one set of software units and controlling communication by the units in the set to be limited to communication only with other units of the set

44 Claims, 18 Drawing Sheets

Relationship between Infohabitants and with Environment,
Showing use of proxies.

U.S. PATENT DOCUMENTS

| | | | |
|---|---|---|---|
| 6,708,225 B1* | 3/2004 | Cho et al. | 719/317 |
| 7,013,389 B1* | 3/2006 | Srivastava et al. | 713/163 |
| 7,036,128 B1* | 4/2006 | Julia et al. | 719/317 |
| 7,124,415 B1* | 10/2006 | Luft | 719/317 |
| 7,269,664 B2* | 9/2007 | Hutsch et al. | 709/246 |

OTHER PUBLICATIONS

Karjoth et al., "A Security Model for Aglets", IEEE Internat Computing, Jul.-Aug. 1997, IEEE, USA, vol. 1, No. 4, pp. 68-77, XP002173280, ISSN: 1089-7801.

Soares et al., "Optimizing the Migration of Mobile Agents", Proceedings of MATA '99, Mobile Agents for Telecommunications Applications, Oct. 1999, XP001013022, Ottawa, Canada.

Lange et al., "Mobile Agents with Java: the Aglet API", World Wide Web, 1998, Baltzer, Netherlands, vol. 1, No. 3, pp. 111-121, XP001013023, ISSN: 1386-145X.

Collins et al, "The Zeus Agent Building Tool-Kit", BT Technology Journal, BT Laboratories, GB, vol. 16, No. 3, Jul. 1, 1998, pp. 60-68, XP000781599.

Herbert et al., "Mobile Java Objects", BT Technology Journal, BT Laboratories, GB, vol. 17, No. 2, Apr. 1999, pp. 115-125, XP000831730, ISSN: 1358-3948.

EPO Communication, European Patent Application No. 02 701 448. 9-2211, Aug. 9, 2005, cover w/enclosure 5pages (Form 2906).

Lange et al., "Mobile Agents with Java: The Aglet A1[1]", World Wide Web Journal, pp. 1-18, 1998.

Karjoth et al., A security Model for Aglets, IEEE Internet Computing Jul.-Aug. 1997, pp. 68-77.

Karnik et al., Agent Server Architecture for the Ajanta Mobile-Agent System, Proceedings of 1998 International Conference on Parallel and Distributed Processing Techniques and Applications (PDPTA'98), Las Vegas, Jul. 1998.

Tripathi et al., Protected Resource Access for Mobile Agent-Based Distributed Computing, Proceddings of ICPP Workshop on Wireless Networking and Mobile and Mobile Computing, Minneapolis, Aug. 1998.

Gutknecht et al, 1997, "MadKit: Organising Heterogeneity with Groups in a Platform for Multiple Multi-Agent Systems", Technical Report 97188, LIRMM, 161, rue Ada—Montpellier, France, Dec. 1997.

Czajkowski et al., "JRes: A Resource Accounting Interface for Java", Proceedings of the 1998 ACM Oopsla Conference, Vancouver, BC, Oct. 1998.

Herbert et al., "Mobile Java Objects", BT Technol J, vol. 17, No. 2, Apr. 1999, pp. 115-125.

Gamma et al., "Design Patterns: Elements of Reusable Object-Oriented Software", 1995, Addison-Wesley, contents pages and design patterns, 5 pages.

Lange et al., Programming and Deploying Java Mobile Agents with Aglets, 1998, contents pages and full index, 17 pages.

\* cited by examiner

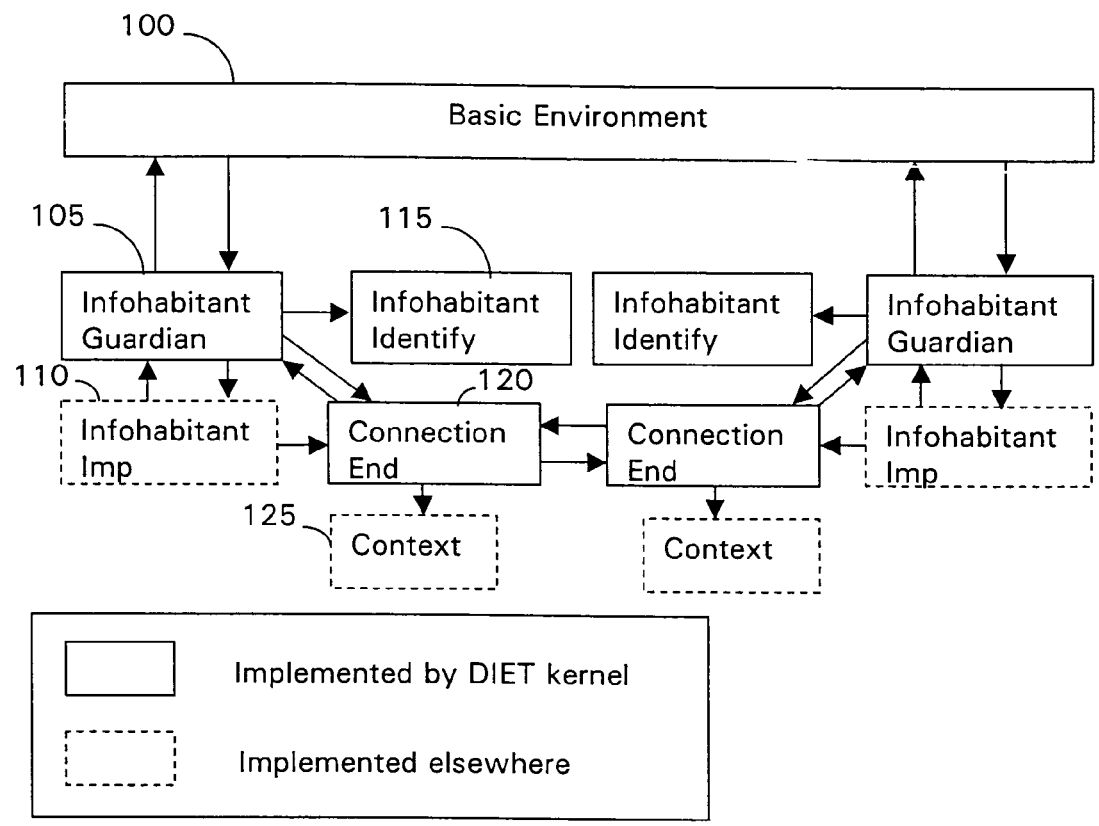
Figure 1. Relationship between Infohabitants and with Environment, Showing use of proxies.

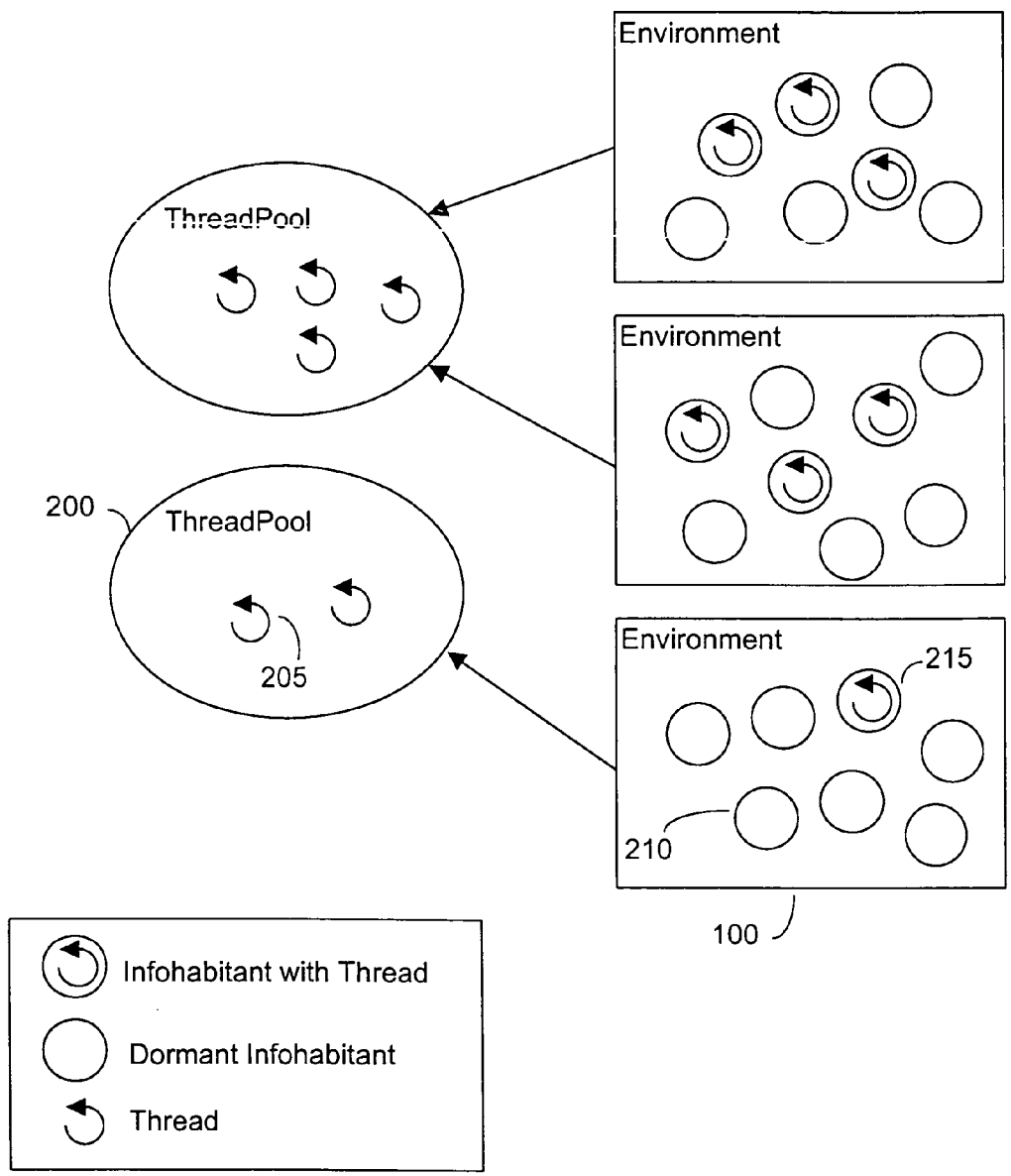
Figure 2. The use of threads within the DIET platform.

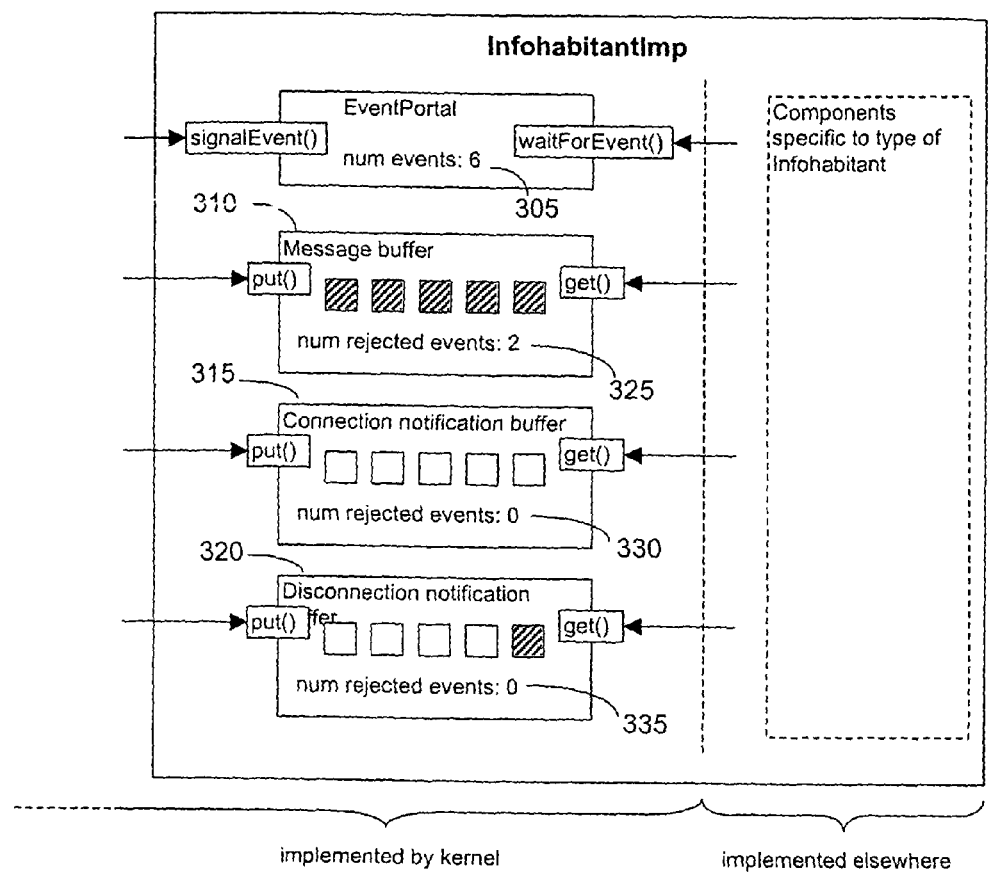
Figure 3. Basic structure of Infohabitants, focussing on "external events".

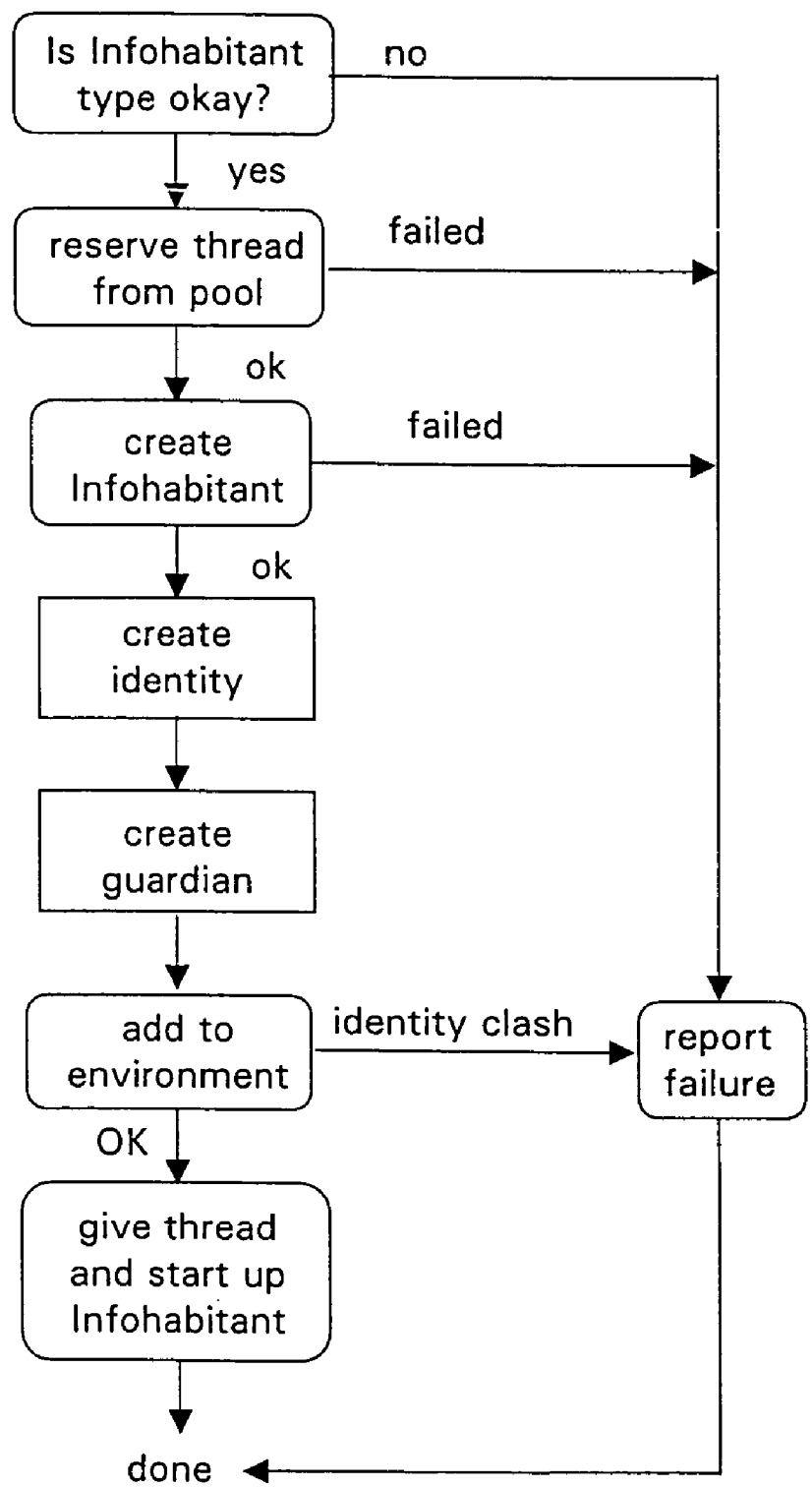
Figure 4. How kernel creates a new Infohabitant.

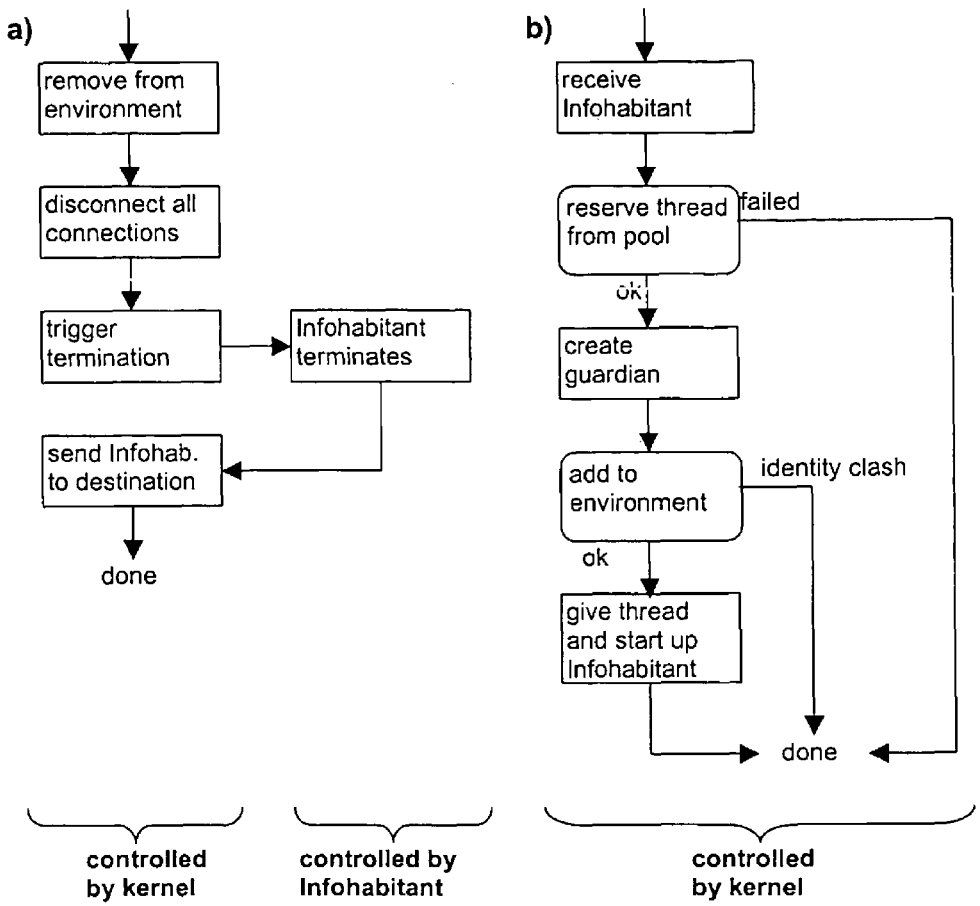
Figure 5. How the kernel handles Infohabitant migration (a) at the source environment, and (b) at the destination environment.

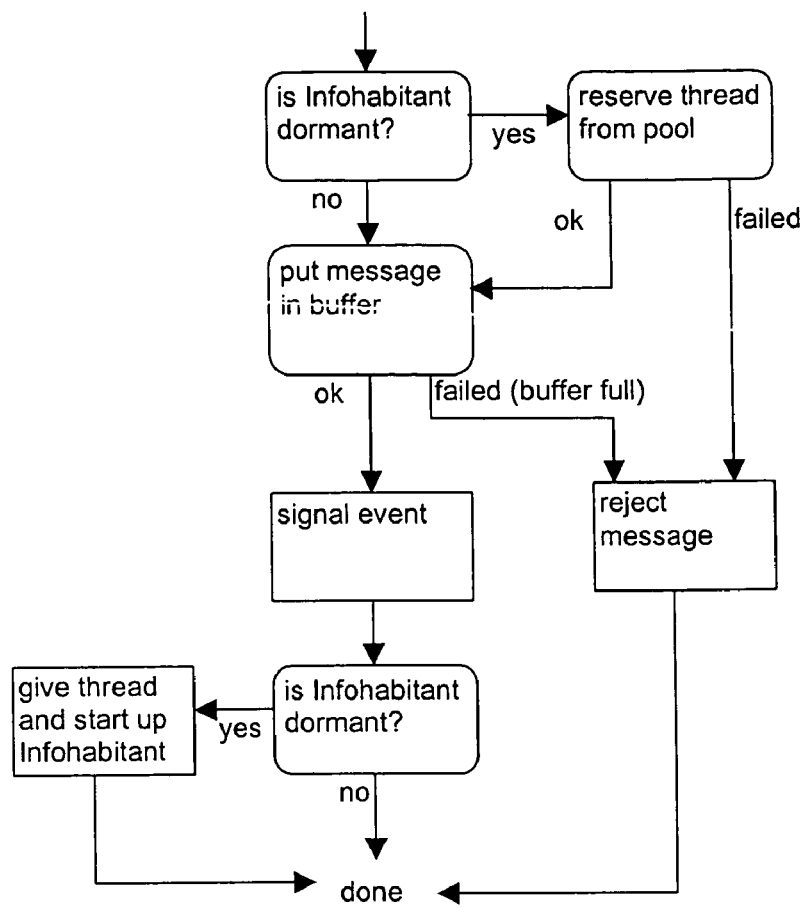
Figure 6. How kernel handles incoming messages for Infohabitants.

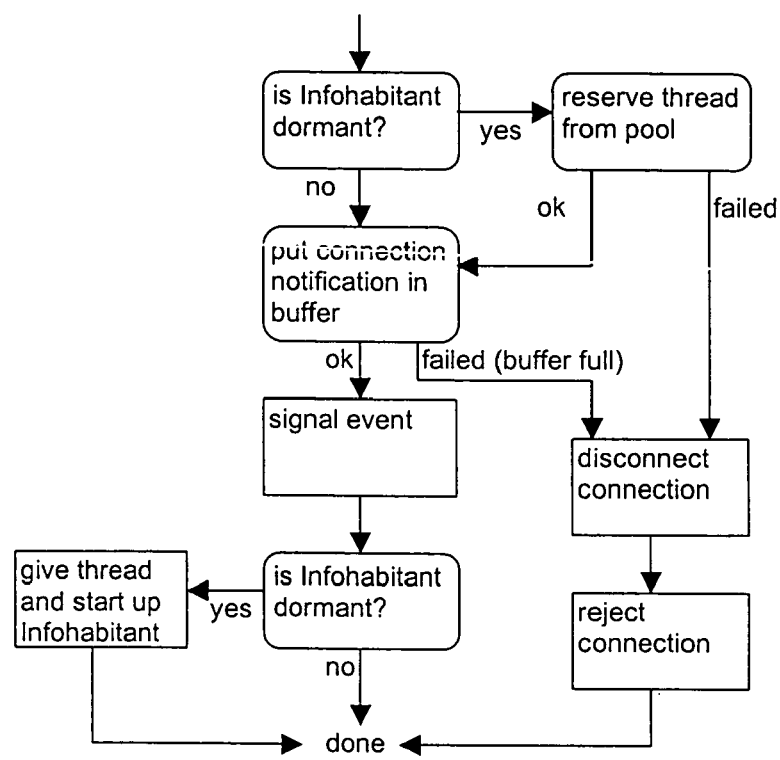
Figure 7. How kernel handles incoming connection notifications for Infohabitants.

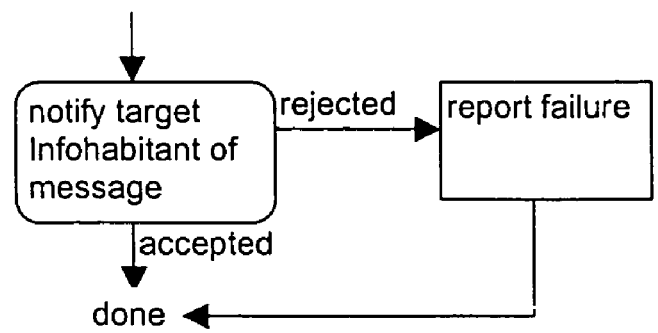
Figure 8. How kernel implements message delivery.

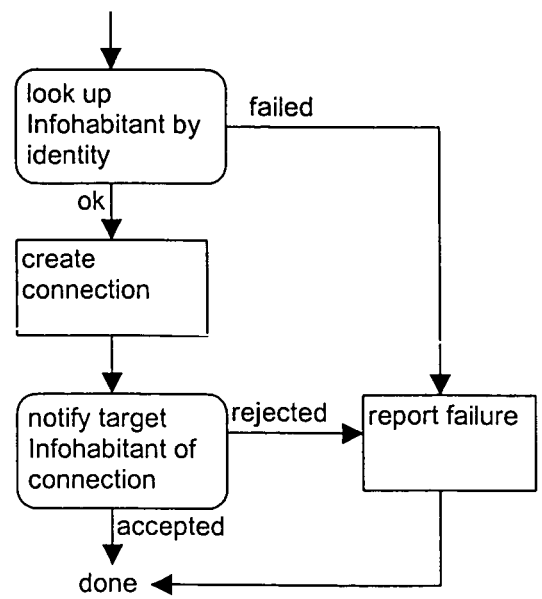
Figure 9. How kernel sets up new connections by Infohabitant identity.

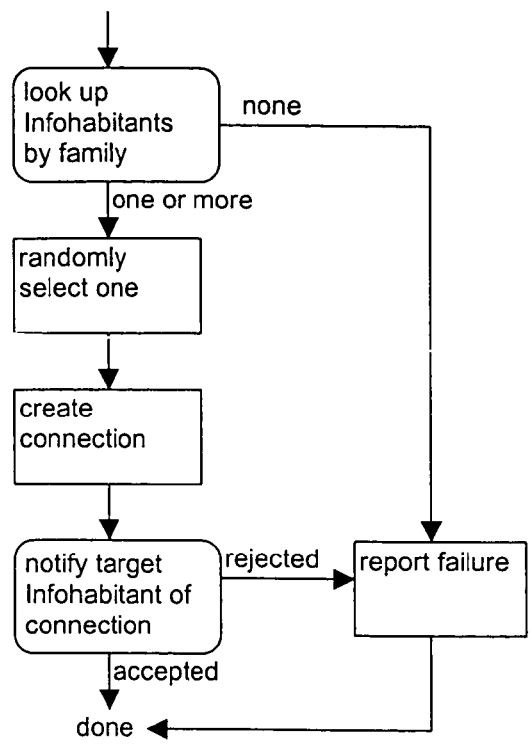
Figure 10. How kernel sets up new connections by Infohabitant family.

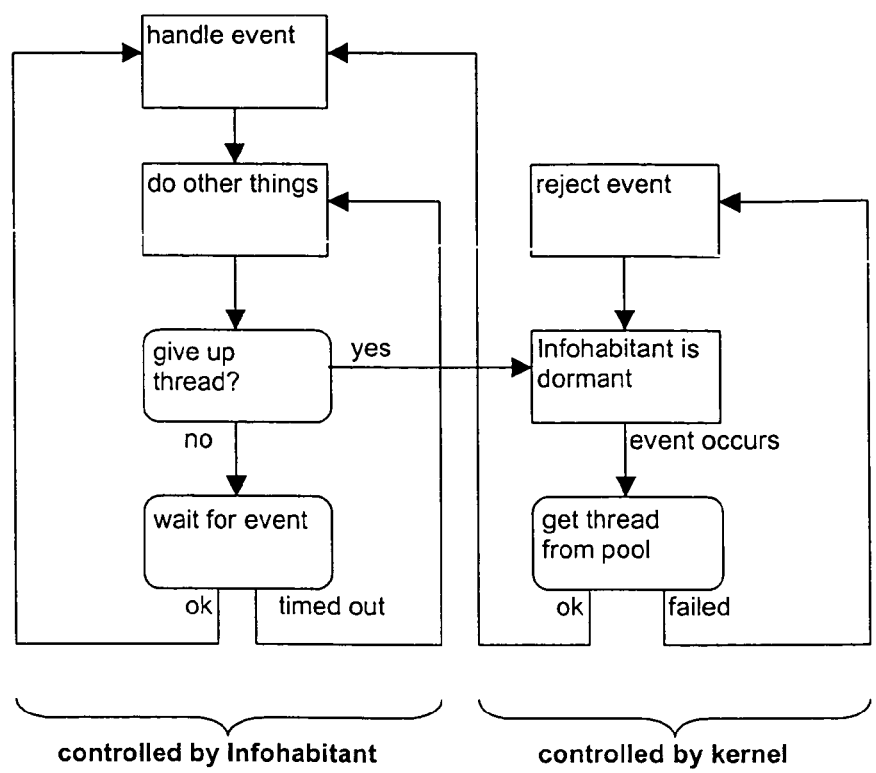
Figure 11. Execution flow of Infohabitants.

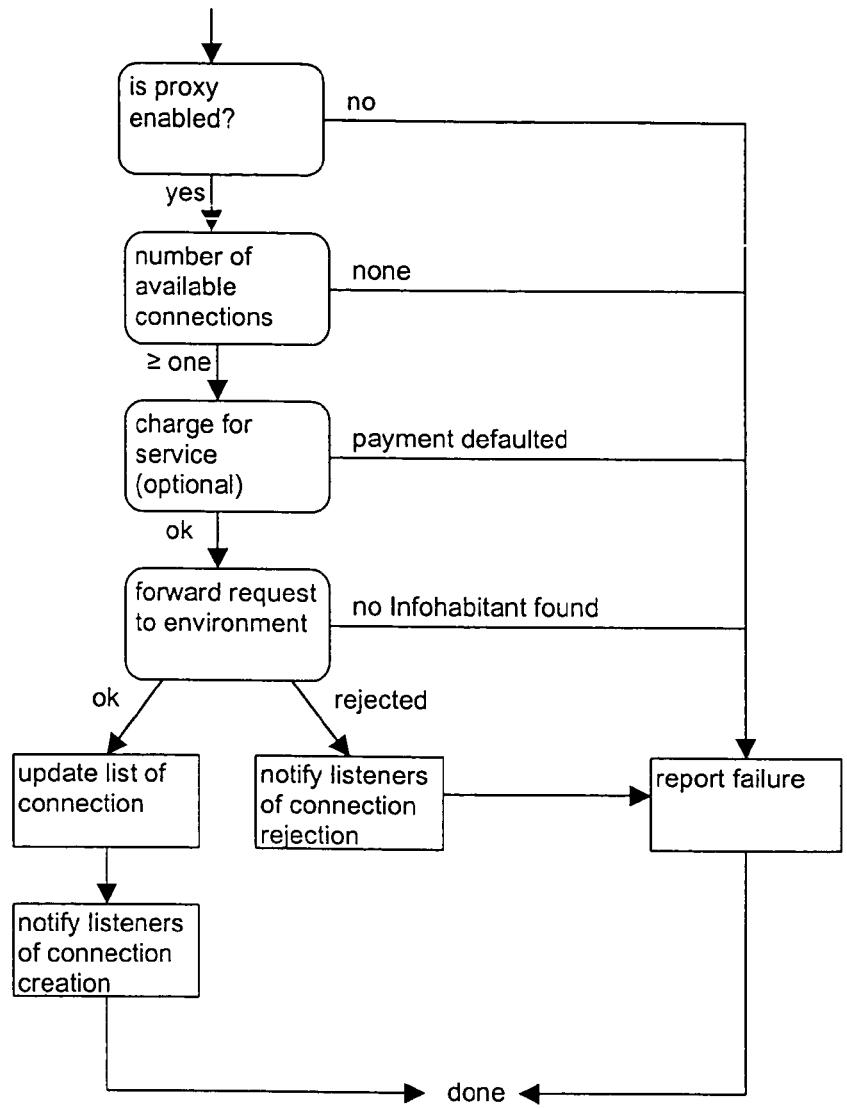
Figure 12. How the InfohabitantGuardian handles a request to set up a new connection.

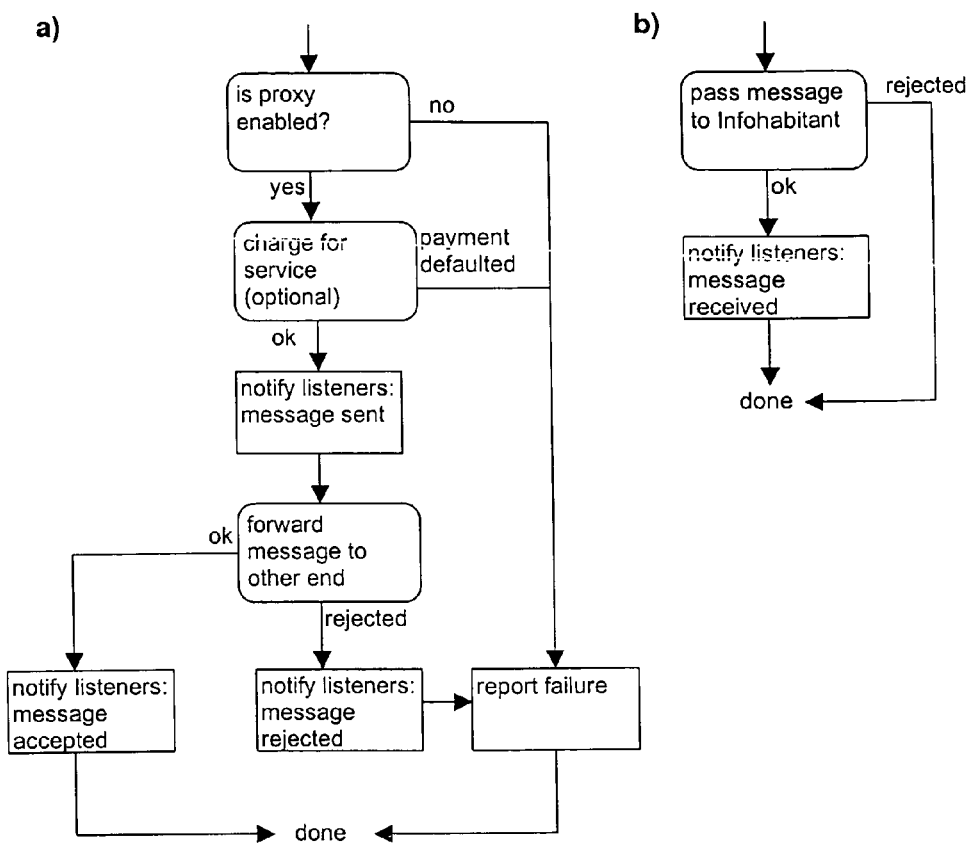
Figure 13. How the ConnectionEnd handles a request to send a message: (a) at the source end of the connection, and (b) at the receiving end of the connection.

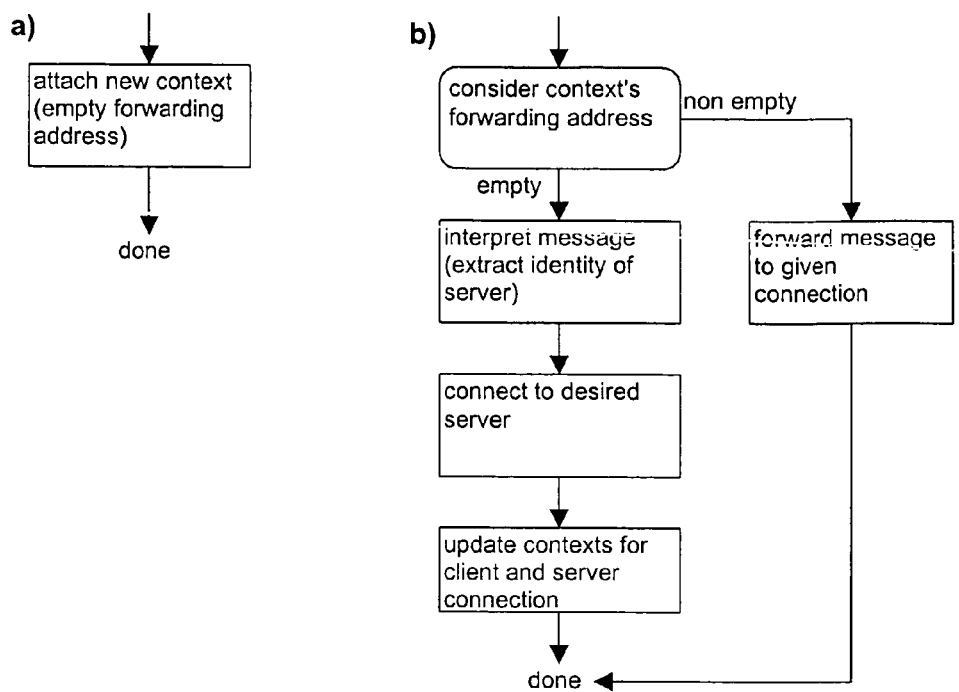
Figure 14. Example implementation of a very basic "Middleman" Infohabitant showing: (a) How it handles new connections, and (b) how it handles incoming messages.

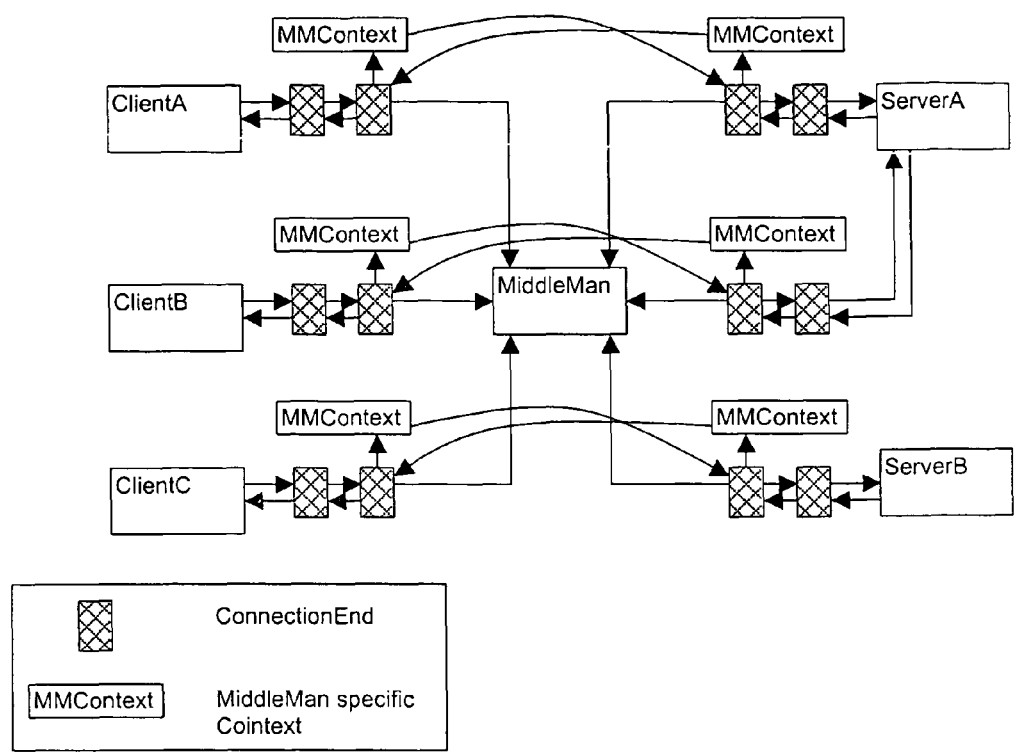
Figure 15. Example configuration of a very basic MiddleMan Infohabitant, connecting three different client Infohabitants to two Server Infohabitants.

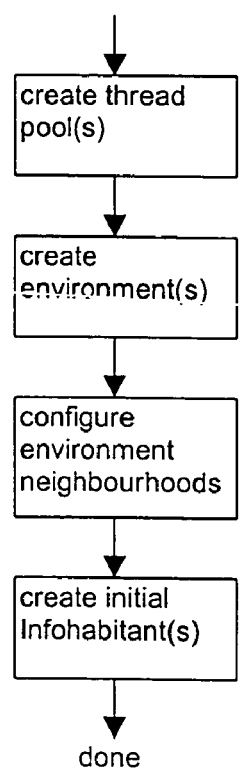
Figure 16. Basic way of setting up the DIET system on a computer.

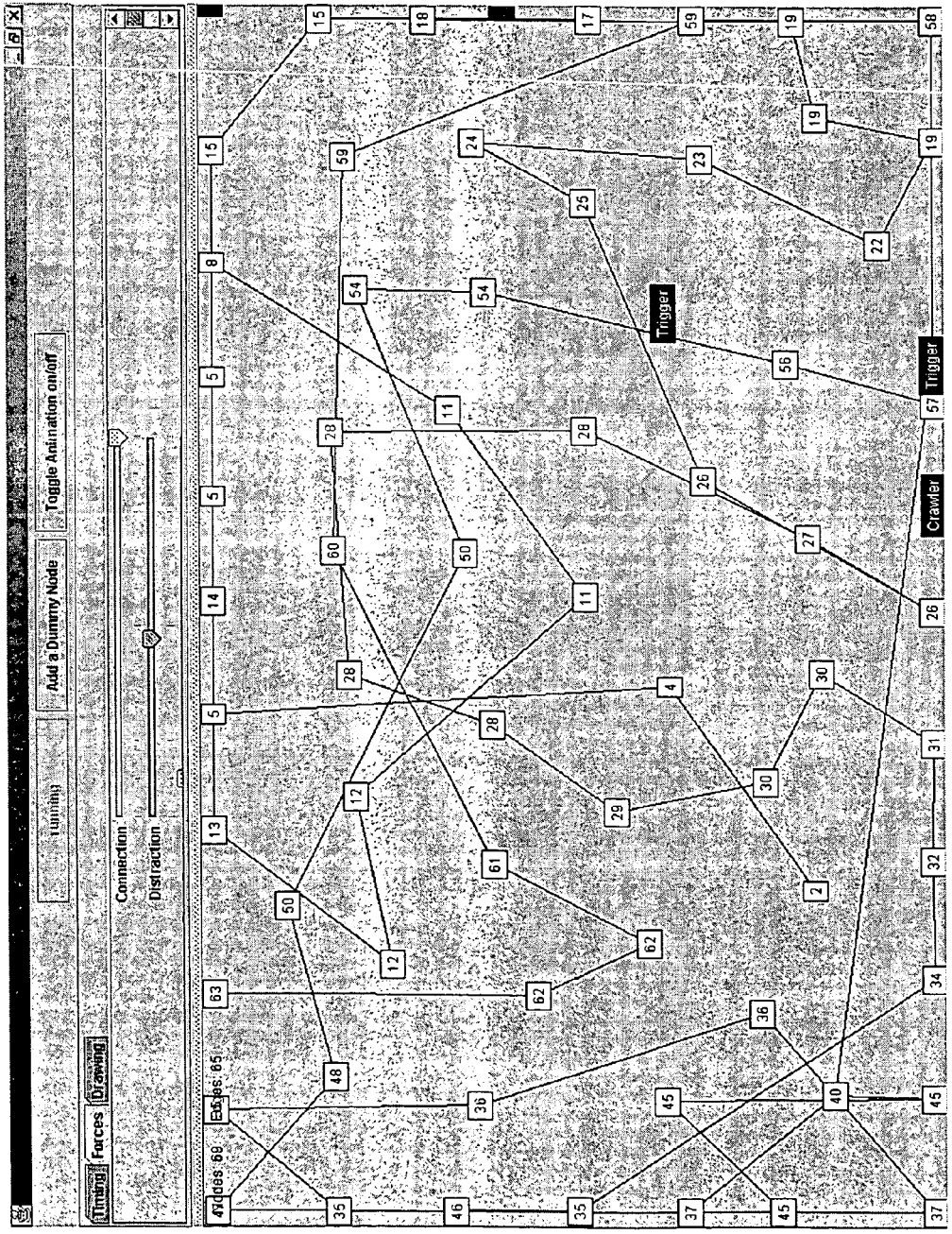
Figure 17. An example of an application running on the DIET software platform.

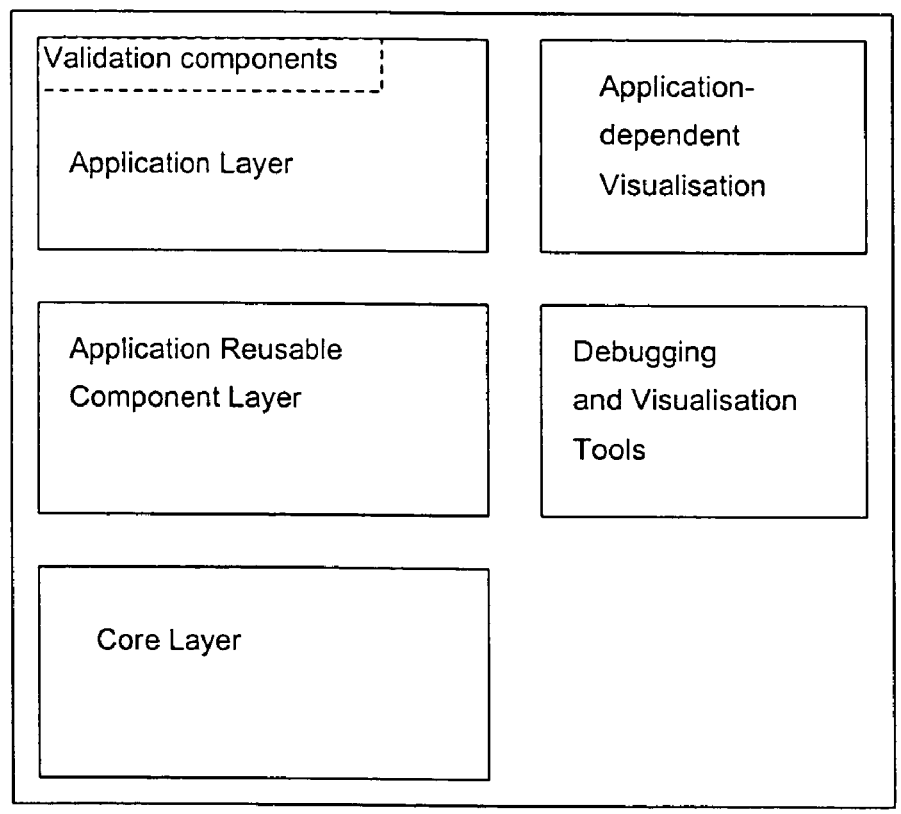
Figure 18. The DIET architecture.

DISTRIBUTED PROCESSING MANAGEMENT FOR DE-CENTRALIZED INFORMATION ECOSYSTEM TECHNOLOGIES (DIET)

This application is the US national phase of international application PCT/GB02/00899 filed 1 Mar. 2002 which designated the U.S.

BACKGROUND

1. Technical Field

The present invention relates to a method and system for distributed processing management and finds particular application in information management.

2. Related Art

It is known to use software agent systems (where an agent comprises software code and usually at least local data which together provide an entity which is to some extent autonomous and proactive) for the manipulation and provision of information to users. These software agent systems are one means of implementing decentralised computational processes.

There also exist software technologies for distributed computing, such as the Common Object Request Brokerage Architecture (CORBA) that can provide functionality for distributed computing similar to some of that provided by software agent systems.

In the construction of such software systems a contrast can be drawn between centralised and decentralised approaches to the design and operation of the software. Centralised approaches have the advantage that the software may be better understood in advance of execution, and that the flow of control is in principle clear. But they may also have the disadvantage that the design is inflexible if the requirements or use of the software changes between initial design and implementation. Hence there is an interest in more decentralised systems that start with simple components and combine them to produce more complex systems. Decentralised approaches have the advantage that individual components can be well understood, and can be moved around if requirements for the system change. The disadvantage is that control in the system may be less predictable.

Because the development of particular software agent systems from scratch for each application could lead to a lot of duplication of software, a number of software agent toolkits have been developed that provide the means of constructing a variety of different software agent systems from one set of tools. While existing software agent toolkits, and other software technologies, do to some extent implement decentralised computing systems, they do suffer from problems of:

Robustness [i.e. how to ensure that the system performs to the required standard despite changes to its software environment that may be disruptive to agent function.]

Scalability [i.e. how to ensure that what works with relatively few agents in a test application works as well with many agents in a real-world application.]

Robustness and scalability have been addressed in a number of ways in existing software agent systems, with varying degrees of success. These are important issues to address if such software technologies are to provide solutions to industrially or commercially significant application problems.

BRIEF SUMMARY

According to the present invention, there is provided a method or system as set out in the accompanying claims. Further inventive aspects of the invention are described below and set out in the drawings.

BRIEF DESCRIPTION OF THE DRAWINGS

A software system referred to herein as the "DIET" system will now be described as an embodiment of the present invention, by way of example only, with reference to the accompanying drawings in which:

FIG. 1 shows a block diagram of components of the DIET system, in particular the relationship between software agents (usually referred to as "Infohabitants" in the following description) and an environment in which they are located, showing use of proxies;

FIG. 2 shows schematically the use of threads, available by means of an operating system of computing platform supporting the system, and their allocation to Infohabitants by the environment of FIG. 1;

FIG. 3 shows a basic structure of an Infohabitant, in particular in relation to the response of the software agent to external events;

FIG. 4 shows in flow diagram a process by means of which a new Infohabitant is created;

FIG. 5 shows in flow diagram a process for handling Infohabitant migration. FIG. 5(a) shows the process at the source environment and FIG. 5(b) shows the process at the destination environment;

FIG. 6 shows in flow diagram a process for handling incoming messages for Infohabitants;

FIG. 7 shows in flow diagram a process for handling incoming connection notifications for Infohabitants;

FIG. 8 shows in flow diagram a process for implementing message delivery;

FIG. 9 shows in flow diagram a process for setting up new connections between Infohabitants;

FIG. 10 shows in flow diagram an alternative process for setting up new connections between Infohabitants;

FIG. 11 shows in flow diagram an execution flow for a process to be carried out by an Infohabitant;

FIG. 12 shows in flow diagram a process for handling a request for setting up a new connection;

FIG. 13 shows in flow diagram a process for handling a request to send a message. FIG. 13(a) shows the process at the source end of the connection and FIG. 13 (b) shows the process at the receiving end of the connection;

FIG. 14 shows, in flow diagram, functionality of an Infohabitant. FIG. 14(a) shows its functionality in handling new connections and FIG. 14(b) shows its functionality in handling incoming messages;

FIG. 15 shows schematically an example configuration of a basic Infohabitant in connecting three client Infohabitants to two server Infohabitants;

FIG. 16 shows a flow diagram of steps in setting up a DIET system on a computer;

FIG. 17 shows a screen shot of an application running on the DIET system;

FIG. 18 shows schematically a general architecture for a DIET system.

DETAILED DESCRIPTION OF EXEMPLARY EMBODIMENTS

The Diet Software Platform

In the following, reference is made to "Decentralised Information Ecosystem Technologies" (DIET) and to the DIET platform. These are references to embodiments of the present invention.

The DIET platform is primarily software which can be installed on one or more computers and used in running distributed applications. As those in the art will recognize, the units of software used in the DIET platform must be stored in non-transitory computer-readable media as so installed on one or more computers. It provides software agents which can run processes involved in supporting an application, and in which the user can install processes which are the application. The platform also provides support to the software agents in their interactions with the computers on which they are installed, such as using the computer operating system (OS) to access and coordinate processing capacity, for instance by thread allocation, and to store or display results. It also provides support to the software agents in their creation, migration and expiry, and inter-agent communications.

In such a platform, many aspects are variable. The DIET software platform is designed to form the base for information management applications. To be useful in practice, the platform needs to support applications that are:

adaptive: Information gets updated constantly, and new information is generated. Users of the information, and their preferences, as well as the system load and infrastructure, can also change. To operate efficiently, information management applications have to adapt to these changes.

scalable: There is a massive amount of information available in the real world, consider for example the World Wide Web. For an information management system to be useful, it needs to be built without any implicit limits on its size.

robust: Failures are inevitable in large-scale, dynamic, distributed systems. So the system needs to be able to cope with them. It needs to handle failing hardware, as well as cope with high system load. Performance should gracefully deteriorate when parts of the system fail.

decentralised: A lot of information is located in a distributed form, as the World Wide Web demonstrates. Decentralisation also helps to enhance scalability, by avoiding critical bottlenecks, and robustness, as it reduces the reliance on particular parts of the system.

The DIET platform has therefore been designed with these properties in mind.

The DIET platform has been developed initially with comparatively lightweight agents. If individual agents can be kept as lightweight as possible, many more agents can be incorporated in the system, and their numbers can be varied much more easily. While the development of lightweight agents precludes the inclusion of some computationally intensive capabilities at the individual agent level, there is potential for the emergence of such properties in the overall system, through interactions between agents. This emphasis on lightweight agents and bottom-up interaction does not however preclude the incorporation of more heavyweight agents where required when extending this platform. More heavyweight agents may, for example, be needed to include sophisticated reasoning or communication capabilities. Nor does it preclude the use of more top-down Artificial Intelligence techniques, which complement and enhance the functionality provided by bottom-up interactions.

The lightweight, bottom-up design should also contribute to the aim of supporting adaptive responses in the platform. Lightweight agents could more easily serve as the subject of population-based adaptive, evolutionary, algorithms. In addition, the diversity of possible configurations possible in interactions between lightweight agents should assist the search for robust solutions, and allow easy modification if these are not initially found.

The flexibility of the design approach of the DIET software platform makes it suitable to support for instance a variety of different information manipulation applications, based upon a set of information processing operations that will be required by some or all applications. At the same time it can provide a platform for the study of research issues concerning interactions in multi-agent systems.

Advantages of embodiments of the present invention are:

A way of regulating interaction between agents and their supporting environment, ensuring that all interaction is indirect by using a specific system of proxies The ability to associate a context with each communication between agents, allowing agents to be lightweight and interactions to execute efficiently The rejection of messages, connections or migration as a mechanism for controlling the overall activity and memory use of the system A naming scheme for agents based on Bitstrings, allowing access to individual agents by way of their identity or by using a particular family they belong to The use of an event portal by each agent to handle all incoming events efficiently The ability to target specifically where to add capability for observing events The indirection of service requests through individual agents The provision for reusable threads and the sharing of threads The provision for resource accounting Implementation The DIET platform is a software system written in the Java programming language. Because Java is an object-oriented programming language, all components of the system mentioned here are objects in the object-oriented programming sense. It will run on any computer which has a suitable Java Virtual Machine installed. Interaction with the system by a user or users will take place via a graphical user interface implemented on the user's computer through its monitor and input devices such as mouse and keyboard.

(It will be understood that a "Class" is a basic concept in object-oriented programming. A class is an object-oriented module that describes the implementation of a "type" of object, including the categories of data associated with objects of that type. Every object is an instance of a specific class. Different objects of the same class differ in their data content.)

Layered Architecture

Referring to FIG. 18, the DIET platform architecture has three layers, a core layer 1800, an Application Reusable Component (ARC) layer 1805 and the application layer 1810.

The core layer 1800 provides the fundamental functionality available to all implementations in the DIET architecture and the constraints under which all DIET agents must operate. It does this primarily by providing the "DIET Kernel" which is a set of Java classes. For instance, in an embodiment of a DIET platform for running an application, the DIET kernel will be used to provide objects of the classes: World; Environment; ThreadPool; Listeners; and Infohabitants.

DIET agents are in fact all objects of the Infohabitant class, reflecting the particular suitability of DIET implementations to information management, and this terminology is generally used below.

The agents themselves (i.e. Infohabitants) are in the ARC and application layers 1805, 1810. The ARC layer 1805 includes optional components that are useful to various applications. These may be Infohabitants or Listeners. An example of an Infohabitant is the CarrierPigeon agent for communicating between different environments which is further described below. Listeners are objects that allow for the validation and testing of DIET applications, and for visualisation of the components within the platform. Listeners are a known class in Java but the DIET platform extends the class. An example of general visualisation and testing components the ARC layer 1805 might provide are EventDumperListeners. Each InfohabitantGuardian and ConnectionEnd proxy maintains a respective list of listener objects, i.e. EventDumperListeners, that are interested in receiving a brief description of every event that occurs (e.g. every Infohabitant that migrates, each message that is sent, every connection that is set up). When such an event occurs, the InfohabitantGuardian, or ConnectionEnd proxy, sends a corresponding brief description of that event to those listeners. The EventDumperListeners can display (on the computer monitor) the brief descriptions received from the InfohabitantGuardians and ConnectionEnd proxies.

The application layer 1810 contains application-specific code. This will be loaded as processes in Infohabitants. Associated with the application layer 1810 may also be application-specific validation components, to enable validation of the applications developed using the DIET platform.

The three layers of DIET systems are now each described in more detail.

Core Layer 1800

As mentioned above, the core layer 1800 provides the DIET kernel. The functionality the DIET kernel provides can be used, but not modified, by higher layers, particularly by Infohabitants in the ARC and application layers 1810. The following takes each of the main classes provided by the DIET kernel and discusses it in detail.

Worlds

"Worlds" and "environments" are known concepts in multi-agent systems, implemented for instance in Java developments. The DIET platform implements one World per Java Virtual Machine. Within this all other elements of the system exist. There can be multiple Worlds simultaneously as multiple Java Virtual Machines are implemented. This will happen if DIET runs on several computers. Within each World, the DIET platform implements one or more Environments. An environment always resides on a single computer. However, one computer can host multiple environments.

To set up a DIET application, there has to be access to a World. Also, debugging and visualisation tools require access to the World. However, for security, Infohabitants should not have access to the World. A simple mechanism is used to provide the appropriate access to the World. The World implementation in Java allows any Object to get a reference to the World as long as it does not yet contain any Environments. Once it contains one or more Environments, this mechanism is disabled (however, any Object that already obtained a reference to the World can still use it). In practice this means that after the simulation has been created, access to the World is only available to "trusted" Objects that were created before the simulation was set up.

The world creates the ListenerCookie that Listeners need to observe InfohabitantGuardians and ConnectionEnds. Whenever a new Environment is added, the world provides it with a reference to the ListenerCookie. The Environment in its turn, gives the reference also to every InfohabitantGuardian it creates. Lastly, the InfohabitantGuardian provides it to every ConnectionEnd it creates. In this way, the ListenerCookie is known to all kernel objects that need to use it. The World is the only kernel object that provides external access to the cookie. In this way, debugging tools can use it to listen to events (and visualise them when that is desired).

It should be noted that the use of cookies for controlling access is known. The following publication is an example:

Czajkowski, G. & von Eicken, T. 1998 Jres: a resource accounting interface for Java. In: Proc. 1998 ACM OOPSLA Conference, Vancouver, October 1998.

The following comprises documentation about the World class.

org.ist_uie.diet.core.imp Class World java.lang.Object

|

+-org.ist_uie.diet.core.imp.World public class World extends java.lang.Object

| Constructor Summary | |
|---|---|
| protected | World( ) |

| Method Summary | |
|---|---|
| void | addWorldListener(WorldListener I)<br>Register a world listener. It receives events whenever an environment is added or removed from the world. |
| protected void | fireEnvironmentAdded(BasicEnvironment env)<br>Notify interested listeners that an environment is added to the world. |
| protected void | fireEnvironmentRemoved(BasicEnvironment env)<br>Notify interested listeners that an environment is removed to the world. |
| BasicEnvironment | get(EnvironmentAddress address)<br>Retrieves an environment given its name. |
| java.lang.Object | getCookie( )<br>Returns the cookie for this world. Owners of this cookie have access to methods that provide "god like" powers over the world. The cookie for instance allows debugging and visualisation tools to listen to connections for specific events. |
| static World | getEmptyInstance( )<br>Returns a Singleton instance of the world. |
| boolean | register(BasicEnvironment env)<br>Registers the given environment. It is stored such that it can easily be retrieved by its address. |
| void | removeWorldListener(WorldListener I)<br>Unregisters a world listener. |
| void | unregister(BasicEnvironment env)<br>Unregisters the given environment. |

Environments

Each Infohabitant has a reference to its InfohabitantGuardian, which in turn has a reference to its Environment. These references are initialised by the kernel each time that an Infohabitant enters an environment, i.e. upon creation of the Infohabitant and after migration of the Infohabitant from one Environment, usually its initial Environment, to another Environment. An Infohabitant's current Environment will provide access to the basic services provided by the DIET kernel. Infohabitants can only communicate directly when they are connected and they can only set up direct connections to Infohabitants in the same Environment.

The DIET Environment class is an interface—i.e. a Java construct whose properties can be inherited by multiple classes, and which cannot itself be used to instantiate an object. The BasicEnvironment class provides the functionality needed to create a DIET Environment object. Two types of Basic Environment can be created: both have a name (a String) and a DIET World associated with them; the second also has an associated ThreadPool and a parameter which regulates the number of connections possible in that environment.

A number of operations (Java methods) can be carried out in BasicEnvironment:

EnvironmentListeners can be added to the Environment.
NeighbourhoodListeners can be added to the Environment.
The [Basic]Environment can be added to a Neighbourhood.
An Infohabitant can be created.
The execution of all Infohabitants in the Environment can be frozen.
The execution of all Infohabitants in the Environment can be unfrozen.
Interested Listeners can be informed that an Infohabitant has arrived in the Environment.
Interested Listeners can be informed that an Infohabitant has been created in the Environment.
Interested Listeners can be informed that an Infohabitant has departed from the Environment.
Interested Listeners can be informed that an Infohabitant has been destroyed in the Environment.
Interested Listeners can be informed that a Neighbourhood has been added.
Interested Listeners can be informed that a Neighbourhood has been removed.
The address of the Environment can be obtained.
EnvironmentListeners can be removed.
NeighbourhoodListeners can be removed.

The following comprises documentation about the DIET Environment class.

org.ist_uie.diet.core.imp
Class BasicEnvironment
java.lang.Object
 |
 +-org.ist_uie.diet.core.imp.BasicEnvironment
public class BasicEnvironment
extends java.lang.Object A basic implementation of a DIET (core layer 1800) environment.

| Constructor Summary |
|---|
| BasicEnvironment(java.lang.String name, World world) Constructor. |
| BasicEnvironment(java.lang.String name, World world, ThreadPool thread_pool, int max_owned_connections) Constructor. |

| Method Summary | |
|---|---|
| void | addEnvironmentListener(EnvironmentListener I) Register an environment listener. |
| void | addNeighbourhoodListener(NeighbourhoodListener I) Register a neighbourhood listener. |
| void | addToNeighbourhood(EnvironmentAddress address) Register to neighbourhood. |
| Infohabitant Identity | create(InfohabitantImp prototype, java.lang.Object params) Create an Infohabitant. |
| void | defrost( ) Resumes the execution of all Infohabitants. |
| protected void | FireInfohabitantArrived(InfohabitantGuardian infohab, EnvironmentAddress origin) Inform interested listeners that an Infohabitant is arrived. |
| protected void | FireInfohabitantCreated(InfohabitantGuardian infohab) Inform interested listeners that an Infohabitant is created. |

| -continued | |
|---|---|
| Method Summary | |
| protected void | fireInfohabitantDeparted(InfohabitantGuardian infohab, EnvironmentAddress destination) Inform interested listeners that an Infohabitant is departed. |
| protected void | fireInfohabitantDestroyed(InfohabitantGuardian infohab) Inform interested listeners that an Infohabitant is destroyed. |
| protected void | fireNeighbourAdded(EnvironmentAddress address) Inform interested listeners that a neighbour is added. |
| protected void | fireNeighbourRemoved(EnvironmentAddress address) Inform interested listeners that a neighbourhood is removed. |
| Environment Address | getAddress( ) Get address of the environment. |
| void | removeEnvironmentListener(EnvironmentListener I) Unregisters an environment listener. |
| boolean | removeFromNeighbourhood(EnvironmentAddress address) Unregisters an environment neighbourhood. |
| void | RemoveNeighbourhoodListener(NeighbourhoodListener I) Unregisters a neighbourhood listener. |
| void | startFreeze( ) Requests that all Infohabitants temporarily suspend their execution. |

ThreadPool

Referring to FIG. 2, a ThreadPool 200 represents a novel arrangement in DIET systems which allows particularly efficient and flexible use of the processing capacity available to a DIET application. In order to run its code, a software agent must be allocated a thread 205 by the operating system of the computer it is installed on. The ThreadPool object maintains a set of threads 205 which Infohabitants 210 can access when they need to run a process. An Infohabitant can relinquish its thread. 205 and become dormant and the thread becomes available to be picked up by another Infohabitant 215. This arrangement controls the maximum demand the DIET application can make on processing capacity and also reduces the load represented by thread management itself, for instance because threads are no longer created and discarded (also known as destroyed).

The Environment is responsible for allocating Threads to Infohabitants. A Thread is an Operating-System concept and can be defined as a context sequentially executing instructions. On creation, Environments provide every Infohabitant with their own Thread. The DIET platform does not prevent Infohabitants from creating and using additional Threads, but it can be advantageous to strictly limit every Infohabitant to use one Thread at most.

Infohabitants can temporarily give up their Thread. When an Infohabitant has nothing to do, it can give up its thread. Infohabitants without a Thread are Dormant 210. When an event occurs the DIET kernel will attempt to give the Infohabitant a thread to handle the event. FIG. 6 for instance shows what happens when a message is sent to an Infohabitant. Similar block diagrams can be shown when a connection is created or destroyed. This technical implementation detail means that the number of Threads required by the platform can be relatively low. As a result, you can run simulations on a single computer with significantly more Infohabitants than would otherwise be possible. MADKit is another multi-agent system that does not require a Thread for each Agent. However, their implementation is significantly different and deviates from the autonomy normally associated with agents in agent systems.

Every Environment has access to a ThreadPool 200. A ThreadPool limits the number of threads allocated by it that are in use at any moment. It will not provide another thread as long as the limit is reached. An Environment can have its own ThreadPool, but it can also be shared by multiple Environments 100. In the latter case you can limit the total number of Threads used by a group of Environments without fixing the allocation of Threads to each Environment.

When Threads are discarded, the ThreadPool is automatically notified. The Thread can then be put back into the pool, which avoids the overhead associated with creating and destroying Threads. (This way of reusing threads is, however, not unique, and has for instance been applied in the Voyager ORB.)

The ThreadPool class is used to instantiate ThreadPool objects. There has to be a preexisting thread—otherwise ThreadPool could not be executed—but the ThreadPool provides a means of providing a convenient pool of threads for access by processes running in DIET. Whether the threads in the ThreadPool are directly inherited from the preexisting thread can vary with the OS.

Three variants of ThreadPool can be constructed:
1. a ThreadPool that limits the number of threads that can be in use at one time. A default size of 200 is used for the pool size (the total number of possible threads, in use or not).
2. a ThreadPool that limits both the number of threads in use and the number in the pool. A default value of "null" is given for the thread group—a grouping of threads of equal priority—which means that the new ThreadPool inherits the thread group from the Thread on which it is constructed.
3. a ThreadPool that limits both the number of threads in use and the number in the pool, and provides a value for the thread group.

The ThreadPool provides a pool of threads.

Once a ThreadPool has been constructed the getExecutor method can be used to run a task on a separate thread within it. Once the task is completed, the thread returns to the pool. The only occasion the getExecutor method will fail to work is when all the threads are in use at once—then it will exit and return the value "null". Another method, notifyTaskDone is used to signal that the thread has completed the task.

Thread group parameter: the thread group parameter actually identifies a particular thread group (it is of type ThreadGroup)—so it can be used to assign the attributes of that (existing) thread group to the thread pool that is being created by ThreadPool. This allows attributes such as priority to be set among the set of threads in the ThreadPool.

Thread group versus pool versus threads in use: a thread group is (from Java API specification) a set of threads defined by the ThreadGroup class (part of the Java API). It provides a means of dealing with groups of threads. A thread pool is an object instantiated in DIET by the ThreadPool class (part of the DIET API) which is used to hold multiple threads these threads may or may not all belong to the same thread group. The thread pool class provides the additional advantages, compared to the thread group, of being able to define the maximum number of threads, and maximum number of active threads in the pool, and having threads revert to the pool for reuse after becoming inactive.

The interesting feature of the ThreadPool is not how it gets hold of threads but what it does with them. This is controlled by the ThreadPool class in the DIET kernel.

Interesting aspects:
1) A way of constraining the overall number of 'parallel' threads which execute on a machine.
a) Execution: Whether the underlying machine is serial or parallel, this helps to minimise the overhead associated with scheduling and synchronising threads. When the number of threads is very large, an overriding proportion of the computational power of the machine can be devoted simply to managing threads, rather than actually doing anything.
b) Memory Overhead: Threads of execution generally require associated memory to maintain the state of the executing code, as well as storage for the state of the thread, (as managed by the OS).
c) Creation overhead: Threads of execution must be constructed. This implies a startup cost. Using a thread pool allows Threads to be re-used, eliminating this startup cost once all threads are created. Threads are recovered after their execution completes, and can then target a new piece of code.
2) Exploitation of Thread Pools within the DIET core—responsive agents. DIET aims to exploit the dynamics arising from very large numbers of agents interacting. When there is an upper limit (imposed by the OS, or by system resource constraints) on the number of Threads which can run at a given time, the DIET platform supports many more 'live' agents than the number of available threads. Agents can enter a 'reactive' phase, within which they are awaiting input from outside, and will remain totally inert otherwise. Nevertheless, they still maintain state, and can be targeted by means of their identity, i.e. that their identity is used in a destination sense when another agent wishes to initiate communication with them. Events, such as the initiation of a connection, take place through the DIET core, which may allocate a Thread from the thread pool to allow the agent to respond to the event.

The following comprises documentation about the ThreadPool class.

org.ist_uie.diet.core.imp
Class ThreadPool
java.lang.Object
 |
 +-org.ist_uie.diet.core.imp.ThreadPool
public class ThreadPool
extends java.lang.Object Maintains a pool of reusable threads. Threads can be used to execute Runnable tasks. After it has finished, the thread does not terminate, but it is ready to execute another task. In this way, a new thread does not have to be created each time something needs to be executed in a separate thread.

| Constructor Summary |
|---|
| ThreadPool(int max_num_threads) |
| Constructor. It uses a default value of 200 for the maximum pool size. Parameters: max_num_threads - the maximum number of threads that can be in use at any moment. |
| ThreadPool(int max_num_threads, int max_pool_size) |
| Constructor. It uses a default value of "null" for the thread group. Parameters: max_num_threads - the maximum number of threads that can be in use at any moment. max_pool_size - the maximum number of unused threads to maintain. |
| ThreadPool(int max_num_threads, int max_pool_size, java.lang.ThreadGroup thread_group) |
| Constructor. Parameters: max_num_threads - the maximum number of threads that can be in use at any moment. max_pool_size - the maximum number of unused threads to maintain. thread_group - the thread group for all threads. When it is "null", a default thread group is created (where the priority of each thread is Thread.NORM_PRIORITY). |

-continued

| | Method Summary |
|---|---|
| org.ist_uie.diet.core.imp.ThreadPool.Executor | GetExecutor( )<br>Executes the given task in a separate thread. The method has been designed such that it does not block and returns as quickly as possible. If the task cannot be executed because there are no available threads, the method exits immediately and returns "false". |
| protected void | notifyTaskDone(org.ist_uie.diet.core.imp.ThreadPool.Executor executor)<br>free a thread |

Listeners

Listeners are the means by which monitoring and visualisation of the DIET system can be carried out. By having Listeners as objects which are notified of all events affecting certain Infohabitants, or of all events of selected types for instance, the data accumulated by a Listener can be processed for various purposes.

The following comprises documentation about the Listener classes in DIET.

There are six listeners in the embodiment of the invention being described: ConnectionEndListener, EnvironmentListener, InfohabitantListener, NeighbourhoodListener, RunListener, and WorldListener, all of which extend java EventListener.

org.ist_uie.diet.core.imp.event
Interface ConnectionEndListener
All Known Implementing Classes:
ConnectionEndEventTracker
public abstract interface ConnectionEndListener
extends java.util.EventListener Listens to connections for messages being sent and received.

| | Method Summary |
|---|---|
| void | messageAccepted(ConnectionEndEvent e)<br>Called when a message was sent, and has been accepted on the other end. |
| void | messageReceived(ConnectionEndEvent e)<br>Called when an Infohabitant has received a message. |
| void | messageRejected(ConnectionEndEvent e)<br>Called when a message was sent, but it was rejected by the receiving Infohabitant. |
| void | messageSent(ConnectionEndEvent e)<br>Called when an Infohabitant has sent a message. | org.ist uie.diet.core.imp.event
Interface EnvironmentListener

All Known Implementing Classes:
EnvironmentEventTracker
public abstract interface EnvironmentListener
extends java.util.EventListener Listens to environments for births, deaths and movements of Infohabitants.

| | Method Summary |
|---|---|
| void | InfohabitantArrived(EnvironmentEvent e)<br>Called when an Infohabitant is arrived. |

-continued

| | Method Summary |
|---|---|
| void | InfohabitantCreated(EnvironmentEvent e)<br>Called when an Infohabitant is created. |
| void | InfohabitantDeparted(EnvironmentEvent e)<br>Called when an Infohabitant is departed. |
| void | InfohabitantDestroyed(EnvironmentEvent e)<br>Called when an Infohabitant is destroyed. | org.ist_uie.diet.core. imp.event
Interface InfohabitantListener

All Known Implementing Classes:
InfohabitantEventTracker
public abstract interface InfohabitantListener
extends java.util.EventListener Listens to Infohabitants for connections being setup and destroyed.

| | Method Summary |
|---|---|
| void | connectionCreated(InfohabitantEvent e)<br>Called when a connection is created. |
| void | connectionDestroyed(InfohabitantEvent e)<br>Called when a connection is destroyed. |
| void | connectionRejected(InfohabitantEvent e)<br>Called when a connection is rejected by an Infohabitant. | org.ist_uie.diet.core.imp.event
Interface NeighbourhoodListener

All Known Implementing Classes:
NeighbourhoodEventTracker, NeighbourhoodEventDumper
public abstract interface NeighbourhoodListener
extends java.util.EventListener Listens to environments for environments being added and removed to/from their neighbourhood.

| | Method Summary |
|---|---|
| void | neighbourAdded(NeighbourhoodEvent e)<br>Called when an environment neighbourhood is added. |
| void | neighbourRemoved(NeighbourhoodEvent e)<br>Called when an environment neighbourhood is removed. | org.ist_uie.diet.core.imp.event
Interface RunListener
public abstract interface RunListener
extends java.util.EventListener Listens to Infohabitants for events concerning its execution. As shown below, it listens for "runTerminated" but it could alternatively or additionally include other events (for instance "runPaused" and "runResumed").

| Method Summary | |
|---|---|
| void | runTerminated(RunEvent e)<br>Called when a running is terminated. | org.ist_uie.diet.core.imp.event
Interface WorldListener

All Known Implementing Classes:
WorldEventTracker, WorldEventDumper
public abstract interface WorldListener
extends java.util.EventListener Listens to worlds for environments being added and removed.

| Method Summary | |
|---|---|
| void | environmentAdded(WorldEvent e)<br>Called when an environment is added. |
| void | environmentRemoved(WorldEvent e)<br>Called when an environment is removed. |

The following comprises documentation about Event classes external to DIET which Listener classes are provided to respond to.

There are six events in the embodiment of the invention being described: ConnectionEndEvent, EnvironmentEvent, InfohabitantEvent, NeighbourhoodEvent, RunEvent, and WorldEvent, all of which extend java Event.

These events are external to DIET, and they are mainly used for analysis and visualisation.
org.ist uie.diet.core.imp.event
Class ConnectionEndEvent
java.lang.Object
　|
　+-java.util.EventObject
　　　|
　　　+-org.ist_uie.diet.core.imp.event.ConnectionEndEvent
public class ConnectionEndEvent
extends java.util.EventObject
Basic event object for "connection end" events.

See Also:
ConnectionEndListener, Serialized Form

| Constructor Summary |
|---|
| ConnectionEndEvent(ConnectionEnd connection, InfohabitantGuardian sender, InfohabitantGuardian receiver, CommunicationPacket packet)<br>An event related to sending packets along a connection. |

| Method Summary | |
|---|---|
| ConnectionEnd | getConnectionEnd( )<br>Returns the end of the connection where the event occurred. |
| CommunicationPacket | getPacket( )<br>Returns the communication packet. |
| InfohabitantGuardian | getReceiver( )<br>Returns the receiver. |
| InfohabitantGuardian | getSender( )<br>Returns the sender. |

-continued

| | |
|---|---|
| java.lang.String | toString( )<br>List sender, receiver, and communication packet as a string. | org.ist_uie.diet.core.imp.event
Class EnvironmentEvent
java.lang.Object
　|
　+-java.util.EventObject
　　　|
　　　+-org.ist_uie.diet.core.imp.event.EnvironmentEvent
public class EnvironmentEvent
extends java.util.EventObject Basic event object for "environment" events.

See Also:
　EnvironmentListener, Serialized Form

| Constructor Summary |
|---|
| EnvironmentEvent(BasicEnvironment source, InfohabitantGuardian infohab)<br>EnvironmentEvent(BasicEnvironment source, InfohabitantGuardian infohab, EnvironmentAddress migration_address) |

| Method Summary | |
|---|---|
| BasicEnvironment | getEnvironment( ) |
| InfohabitantGuardian | getInfohabitant( ) |
| EnvironmentAddress | getMigrationAddress( )<br>Returns the origin/destination when the event is used for a migration event. |
| java.lang.String | toString( )<br>List an Infohabitant and its migration address. | org.ist_uie.diet.core.imp.event
Class InfohabitantEvent
java.lang.Object
　|
　+-java.util.EventObject
　　　|
　　　+-org.ist_uie.diet.core.imp.event.InfohabitantEvent
public class InfohabitantEvent
extends java.util.EventObject Basic event object for "Infohabitant" events.

See Also:
　InfohabitantListener, Serialized Form

| Constructor Summary |
|---|
| InfohabitantEvent(InfohabitantGuardian source, ConnectionEnd near_end, ConnectionEnd far_end, InfohabitantGuardian initiating_infohab, InfohabitantGuardian passive_infohab)<br>An event related to creation and destruction of an Infohabitant's connection. |

| Method Summary | |
|---|---|
| ConnectionEnd | getFarConnectionEnd( )<br>Returns the far end of the connection. |
| InfohabitantGuardian | getInitiatingInfohabitant( )<br>Returns the initiating Infohabitant. |
| ConnectionEnd | getNearConnectionEnd( )<br>Returns the near end of the connection. |

-continued

| | |
|---|---|
| InfohabitantGuardian | getPassiveInfohabitant( ) |
| | Returns the passive Infohabitant. |
| java.lang.String | toString( ) |
| | Determine the Infohabitant that initiated the event (so that it can be marked with an asterisk). | org.ist_uie.diet.core.imp.event
Class NeighbourhoodEvent
java.lang.Object
  |
  +-java.util.EventObject
     |
     +org.ist_uie.diet.core.imp.event.NeighbourhoodEvent
public class NeighbourhoodEvent
extends java.util.EventObject Basic event object for "neighbourhood" events.

See Also:
   NeighbourhoodListener, Serialized Form

| Constructor Summary |
|---|
| NeighbourhoodEvent(BasicEnvironment source, EnvironmentAddress address) |

| Method Summary | |
|---|---|
| EnvironmentAddress | getAddressOfNeighbour( ) |
| BasicEnvironment | getEnvironment( ) |
| java.lang.String | toString( ) |
| | List the environment address and neighbourhood address. | org.ist_uie.diet.core.imp.event
Class RunEvent
java.lang.Object
  |
  +-java.util.EventObject
     |
     +-org.ist_uie.diet.core.imp.event.RunEvent
public class RunEvent
extends java.util.EventObject Basic event object for "run" events.

See Also:
   RunListener, Serialized Form

| Constructor Summary |
|---|
| RunEvent(java.lang.Object source) | org.ist_uie.diet.core.imp.event
Class WorldEvent
java.lang.Object
  |
  +-java.util.EventObject
     |
     +-org.ist_uie.diet.core.imp.event.WorldEvent
public class WorldEvent
public class WorldEvent
extends java.util.EventObject Basic event object for "world" events.

See Also:
   WorldListener, Serialized Form

| Constructor Summary |
|---|
| WorldEvent(World source, BasicEnvironment env) |

| Method Summary | |
|---|---|
| BasicEnvironment | getEnvironment( ) |
| World | getWorld( ) |
| java.lang.String | toString( ) |
| | List environment address. |

Infohabitants

Referring to FIG. 3, an Infohabitant is a software agent. As a basic minimum, it is provided with means for communicating with other Infohabitants. It will also usually be provided with software code for performing one or more series of operations in use. When an application runs using the DIET platform, Infohabitants in the ARC and application layers 1810 will run their code as necessary. In running their code, they will need to communicate with their environment and, via the environment, with other Infohabitants. For instance, Infohabitants communicate with their environment when they need kernel services, such as connecting to other Infohabitants or creating other Infohabitants. They need to communicate with other Infohabitants to exchange data messages. The other Infohabitants might also be in the application layer 1810, or they may supply application re-usable services and thus be in the ARC layer 1805. As far as the Infohabitant is concerned, for these communications to occur, there are a limited number of events that will happen in support for which it will require a thread in order to respond.

Infohabitant Naming Scheme

The primary capability built into every Infohabitant is the ability to communicate with each other. Every Infohabitant has a (local) identity consisting of a binary name tag and a binary family tag. The name tag allows Infohabitants to be uniquely identified within their own environment, and the family tag can be used to look up Infohabitants by functionality. Family tags can be used as a shared identifier for a group of agents, or as an identifier which can be set according to an agreed rule, or as an evolved identifier which externally distinguishes a specific sub-species of adaptive agent.

A very simple example of an agreed rule is that Infohabitants construct their family tag from a text string. A convention that is used for many Infohabitants in DIET is to use the full name of the class (e.g. "org.ist_uie.diet.arc.services.Carrier") that implements the Infohabitants. It is even possible that Infohabitants of the same class, initialise their family tag differently. For instance, WebPageAnnotation Infohabitants can be created for maintaining comments about webpages. Each such Infohabitant would be responsible for maintaining comments about a respective single page. Each such Infohabitant could construct its family tag from the URL of the page that it represents. In this way, if an Infohabitant wants to find out what the comments are about a certain webpage, it can simply generate the family tag from the URL of the webpage, and subsequently try to connect to an Infohabitant with such a family tag. If this succeeds, it can communicate with the Infohabitant to obtain comments about the webpage. In practice, the family tag would be generated from more than the URL alone, to reduce the chance of name clashes with Infohabitants that provide other web-page related functionality, e.g. providing links to similar webpages. A good approach would for instance be to XOR the binary representation of the URL with the binary representation of the Infohabitant's full classname.

A simple example of an evolving identifier is where the behaviour of an Infohabitant is controlled by a binary genome. Its family tag can then partly be constructed from the value of its genome.

Infohabitants in their own environment perform inter-Infohabitant communication by treating Infohabitant identities as addresses. In a wider context, Infohabitants are uniquely identified by including as a part of their global identity, the identity of their own environment, and the identity of the World in which that environment resides. Thus, the respective identities of Infohabitants, Environments and Worlds are equivalent to addresses, and herein the terms "identity" and "address" are used synonymously.

Every Infohabitant has an InfohabitantIdentity that consists of two bitstrings, a Name Tag and a Family Tag. The Name Tag can be used to identify Infohabitants and is randomly initialised by the DIET kernel when the Infohabitant is created. As long as the Name Tags are sufficiently long, the probability that two Infohabitants have equal names is effectively zero. For instance, when tags are 128 bits long, the probability that two or more Infohabitants in a group of one million have the same name is $1.5 \times 10^{-26}$. The advantage of this approach is that it is decentralised and thus scales well.

The Family Tag can be used to distinguish between different types, or families, of Infohabitants. It is set by the Infohabitant when it is created, and remains constant throughout the lifetime of each Infohabitant.

Environments provide two ways of looking up Infohabitants. To connect to an Infohabitant, it is necessary to specify either a complete identity or a Family Tag. The former can be used to look up specific Infohabitants whereas the latter can be used to look up Infohabitants by functionality. By only providing basic ways of connecting to Infohabitants this can be done quickly (even when there are many Infohabitants) while still using relatively little memory.

Three example Infohabitant identities are shown below:
A: identity=(name=01100101, family=11000101)
B: identity=(name=1010110011, family=010011)
C: identity=(name=00010001, family=11000101)

Here Infohabitant A and Infohabitant C have equal family tags. All name tags are unique, but that is not surprising as these are all initialised randomly. Note, in real applications tags are typically longer (e.g. 128 bits). A name tag and a family tag do not necessarily have to be of the same length. Also, the length of name tags and/or family tags can be different for different Infohabitants.

The identity of an Infohabitant is held by an InfohabitantIdentity object, which is maintained by the InfohabitantGuardian proxy (See FIG. 1). By making the InfohabitantGuardian responsible for maintaining the identity instead of letting the Infohabitant itself do so, Infohabitants are prevented from changing their identity during their lifetime.

The following documents Infohabitantidentity.
org. is tuie.diet.core
Class Infohabitantidentity
java.lang.Object
 |
 +—org.ist_uie.diet.core.InfohabitantIdentity
public final class Infohabitantidentity
extends java.lang.Object Stores the identity of an Infohabitant. An identity consists of a name tag and a family tag.
Note: Objects of this class are immutable.

| Constructor Summary |
| --- |
| InfohabitantIdentity(Tagname, Tag family) |

| Method Summary | |
| --- | --- |
| boolean | equals(java.lang.Object other) |
| Tag | getFamily( ) |
| | Identifies the family that this Infohabitant belongs to.. |
| Tag | getName( ) |
| | Returns the name for the Infohabitant.. |
| int | hashCode( ) |
| java.lang.String | toString( ) |
| | Returns a short representation of this identity. |

Methods inherited from class java.lang.Object
clone, finalize, getClass, notify, notifyAll, wait, wait, wait Constructor Detail
Infohabitantidentity
public InfohabitantIdentity(Tag name, Tag family)

Method Detail
getFamily
public Tag getFamily( )

Identifies the family that this Infohabitant belongs to. It is set on creation of the Infohabitant. It is possible that Infohabitants of the same Java class have the same family tag, but this does not need to be the case. The tag may evolve over time, allowing the emergence of new families/species.
Returns:
the family tag
getName
public Tag getName( )

Returns the name for the Infohabitant.
It is initialised randomly by the environment on creation of the Infohabitant.

Returns:
the name tag
equals
public boolean equals(java.lang.Object other)

Overrides:
equals in class java.lang.Object
hashCode
public int hashCode( )

Overrides:
hashCode in class java.lang.Object
toString
public java.lang.String tostring( )

Returns a short representation of this identity.
Note: Different identities can map to the same representation, but this is unlikely. It is always possible to use the tags directly to construct a unique representation.

Overrides:
toString in class iava.lang.Object

Event Portal
The DIET kernel has been designed to be as lightweight as possible. It provides only essential services, and always in a very basic way. This helps to make it more scalable, and enables it to deliver its functionality quickly and efficiently.

Robustness is explicitly addressed in the DIET core by directly exposing Infohabitants to potential failure, for instance in being allocated a thread in order to run a process or in communications between Infohabitants. This allows them to adapt to system load and change their behaviour accordingly. Part of the implementation of this exposure to failure lies in the EventPortal.

Referring to FIG. 3, for every Infohabitant the kernel implements an EventPortal. The EventPortal registers every event, for instance signalling an incoming message, a new connection etc., in respect of its Infohabitant. As a central point of event notification, the EventPortal can be used to coordinate the Thread state of an Infohabitant, for example a Thread may enter the EventPortal's 'wait for event' block (see FIGS. 3 & 11). This means that no more CPU cycles will be used by this Thread until a new event is notified to the EventPortal. The EventPortal allows Infohabitants to use their threads efficiently because information collected by the EventPortal can be used in deciding whether the Infohabitant should continue execution, pause execution, retain its thread or abandon it and become dormant until a new event occurs. The way in which the Infohabitant Thread is manipulated according to the state of the EventPortal is detailed in FIG. 3 and FIG. 11.

FIG. 3 shows how an EventPortal deals with events external to an Infohabitant. Messages, connection notifications and disconnection notifications each constitute an event for which the Infohabitant will need an allocated thread. The EventPortal provides buffers for each of the three types of event and each signalled event will be stored in the appropriate buffer. These comprise a message buffer 310, a connection notification buffer 315 and a disconnection notification buffer 320.

The EventPortal maintains a count of events 305 which have been signalled to the Infohabitant but not dealt with. As shown in FIG. 3, the Infohabitant has a count of six such events. The six events held in the buffers as shown can be seen to be five messages in the message buffer 310 and a disconnection notification in the disconnection notification buffer 320.

Each of the three buffers also has a counter that tracks how many attempts have been made to put an item in the buffer that failed (because the buffer was full, see FIGS. 6 and 7). Although the Infohabitant that owns the buffer is not directly notified when this happens, the counter ensures that the Infohabitant can be aware of these rejections. That is, the presence of the counters ensures that the Infohabitant contains the relevant data which it can access if triggered to do so for instance for use in debugging of the system. Many Infohabitants can safely ignore the rejection counters, as their proper functioning is not affected by it. However, some Infohabitants may need to update their state or perform other actions when events have been rejected. Such an Infohabitant could for instance check if it has rejected any events every time it finishes handling an event.

FIGS. 4 to 10 show various self-explanatory flow charts of processes involving the DIET kernel and its interactions with Infohabitants. FIG. 11 shows the generalised execution flow in relation to events, between the Infohabitant and the kernel. Each Figure shows the steps of a specific process, as listed in the list of Figures above. The following discusses the specifically event-related aspects of these processes.

FIG. 6 shows when the kernel signals an event to an Infohabitants EventPortal. FIG. 11 shows how and when an Infohabitant typically uses the ability to wait for an event.

FIG. 4: "create guardian" creates the InfohabitantGuardian (see FIG. 1) for the Infohabitant. "report failure": the initiating Infohabitant is signalled by an exception that the creation failed (when no exception occurred, the attempt was successful). Creation can fail because the requested Infohabitant type is not permitted; the request for a thread to be reserved failed; the parameters that are used to initialise the Infohabitant have an invalid value; or when there is an existing Infohabitant in the environment having the same identity.

FIG. 5: "trigger termination": signals the Infohabitant to terminate its execution. Control goes briefly back to the Infohabitant's code ("Infohabitant terminates"), where the Infohabitant can perform some additional clean up (e.g. close open files). However, since it is already disconnected from the environment it cannot contact the environment or any other Infohabitants. As soon as the Infohabitant's execution has finished, control goes back to the kernel which sends it to the destination environment.

FIG. 8: "notification of target Infohabitant": as shown in FIG. 6. "report failure": the initiating Infohabitant is signalled that the message was not successfully sent.

FIG. 9: "notification of target Infohabitant": as shown in FIG. 7. "report failure": the initiating Infohabitant is signalled that a connection was not successfully set up. In this example, the kernel is using the locally unique identity, the Name Tag, together with the Family tag, of a single Infohabitant in order to select the target Infohabitant.

FIG. 10: "notification of target Infohabitant": as shown in FIG. 7. "report failure": the initiating Infohabitant is signalled that a connection was not successfully set up. In this example, the kernel is using the family identity of a set of Infohabitants, the Family Tag, and has to carry out the extra step of selecting an Infohabitant from the family as a target Infohabitant.

Environments and Services to Infohabitants

Basic Services

Referring to FIG. 1, the DIET kernel provides certain elements of the DIET platform, by means of a basic environment 100, a set of proxies (the InfohabitantGuardian 105, ConnectionEnd 120), parts of the Infohabitant implementation 110 (particularly the event portal as shown in FIG. 3), Infohabitantidentity 115, and contexts 125 for use in connections between Infohabitants 110.

Environments only provide a bare minimum of basic services to Infohabitants. Other services can be built on top of these basic services, and do not need to be provided by the DIET kernel. The advantages of this approach are that the Environment is more suitable for hosting many Infohabitants and that the implementation of higher level services can be adapted to the needs of the specific DIET application. The approach is similar to the "micro-kernel" in a system known as MADKit (reference given below). Their micro-kernel is intentionally limited as well, although it differs in the services that it provides.

The basic services provided by each Environment are:
New Infohabitants can be created
Infohabitants can move to another Environment
Infohabitants can connect to other Infohabitants in the Environment.

The services provided by Environments are unreliable. The Environment provides the services when it can, but fails immediately when it cannot. For example, every Environment can have a strict limit on the number of Threads that it can allocate (this is discussed further under the heading "Allocation of threads" below). This means that creation of an Infohabitant or its migration fails when there is currently no thread is available. In both cases, the Infohabitant dies.

The idea of putting a strict limit on certain resources, and thereby making the services that relate to it unreliable, is used at various places within the DIET platform. It makes the platform more robust because it will, for instance, not run out of memory when the system load is high. Instead, it makes high system load visible to Infohabitants and forces them to adapt to it.

Infohabitant Creation

Referring to FIG. 4, new Infohabitants can be created. To create an Infohabitant, the user specifies the type of Infohabitant to create and the parameters to use. The kernel checks the type of the Infohabitant to ensure that it obeys a few basic rules. It checks that the type is an instance of (i.e. a subclass of) the "BasicInfohabitant" class. The "BasicInfohabitant" class is an Infohabitantimp that obeys the basic rules. Its implementation is such (using normal Java/OO techniques) that subclasses cannot change this behaviour. The kernel also assigns a randomly generated name tag to the Infohabitant. This is a simple, efficient mechanism to allocate names that are in practice unique. The Infohabitant can choose its own family tag, but the kernel ensures that the identity of an Infohabitant remains fixed throughout its lifetime.

Infohabitant to Infohabitant Connection

Referring to FIGS. 6, 7 and 8, Infohabitants can connect to other Infohabitants in the same environment. Once connected, Infohabitants can communicate by sending messages or passing additional objects to each other. By only allowing local connections, Infohabitants can receive immediate feedback when sending a message. It was either delivered successfully, or it was rejected. Referring to FIGS. 9 and 10, connections can be established in only two ways, by specifying either a complete identity or the family tag of the required Infohabitant. Both look-up mechanisms can be implemented and used very efficiently. More complicated directory functionality can be built on top of this base functionality and provided by Infohabitants if needed.

Infohabitant Movement between Environments

Referring to FIG. 5, Infohabitants can move to another environment. Infohabitant mobility is useful to make the system more adaptable to changing circumstances. It allows an Infohabitant to select from various execution environments, depending upon the availability and efficiency of environmental services, and it can help in the formation of neighbourhoods of social interaction between Infohabitants. The kernel does not guarantee that every migration attempt succeeds. When an Infohabitant wants to move, but the destination environment can not accept it, for example because it is currently off-line or has reached its full capacity, the Infohabitant dies.

Every Environment maintains a list of Environments that are in its Neighbourhood. Neighbourhood relationships are created by the user and can be set up arbitrarily. Typically, neighbouring environments are physically close (e.g. running in the same Java VM, running on the same computer, or running on a nearby computer), however, this need not be the case.

The concept of Neighbourhood is used to implement one migration mechanism. An Infohabitant can request to migrate without specifying the address of an Environment to move to. In this case, the Environment will randomly select one of the Environments in its Neighbourhood and (attempt to) migrate the Infohabitant to it. This mechanism allows light-weight Infohabitants to sensibly explore the DIET universe, without the need to provide them with the addresses of one or more Environment on their creation.

(Note: Infohabitants are not restricted in their movement by the Environment's Neighbourhood. When an Infohabitant has the address of an Environment that is not in the Neighbourhood of the current Environment, it can still directly migrate to the remote Environment.)

There is no specific event that triggers Infohabitants to move. This depends on the specific type (class) of Infohabitant. E.g. CarrierPigeons are implemented such that they always directly move after they have been created (more details below).

When an Infohabitant migrates to an Environment that is currently offline/full, it is simply not restarted and the Infohabitant is discarded. So, Infohabitants cannot do anything after this has happened. However, to minimise the risk of it dying, an Infohabitant can check beforehand if the Environment is offline or full. It can, for instance, create a "Scout" Infohabitant. The behaviour of a Scout can be very basic. On creation it moves to a given remote Environment. When it arrives at the remote Environment, it immediately moves back to its original Environment. Here it contacts the Infohabitant that created it. The latter Infohabitant then "knows" that the remote Environment was available. This is no absolute guarantee that it still is (it could have gone off-line just after the Scout left), but makes it highly likely.

It should be noted that the DIET system intentionally does not attempt to provide any absolute guarantees, as this is impossible given the nature of the infrastructure—the remote environment can, in principle, terminate at any moment.

For both communication and migration the kernel support is minimal. It can therefore be implemented very efficiently. It also allows more sophisticated functionality to be build on top of it, implemented in a way best suited to the conditions in which it is used. The minimalistic implementation is partly achieved because the kernel only fulfils any request when it can easily do so, but immediately fails when it cannot. It has the additional advantage that it implicitly forces Infohabitants to take the effect of their actions on their execution environment into account.

Another feature of the kernel is that explicit limits can be imposed on several elements in the system such as the number of threads that are in use and the size of the message buffer of every Infohabitant. These limits help to make the DIET platform more robust with respect to system load. For example, when a new message arrives at an Infohabitant whose incoming message buffer is full, it is simply rejected. This mechanism ensures that the system will not run out of memory when one or more Infohabitants receive more messages than they can handle. It also exposes the sending Infohabitant to the congestion so that it can adapt its behaviour accordingly.

These limits can be set by the user. For instance they can be set when the DIET software starts running (while the Environments are created), but some (e.g. the number of threads available) could easily be changed (by the user) while the system is running. The ThreadPool waits with creating Threads until they are first needed (so initially there are as many Threads as there are Threads in use). However, when the demand on Threads decreases, the ThreadPool may hang on to the Thread instead of discarding it (for sake of efficiency—there is a certain cost associated with creating Threads), as is shown in FIG. 2. It means that there can be more Threads than there are Threads currently in use.

Another limit that the kernel can set is the maximum number of Connections that every Infohabitant can own. An Infohabitant "owns" a connection when it was the one that created it. This limit affects the "number of available connections" mentioned in FIG. 12. These are all limits which can be imposed by the kernel.

The kernel has also been designed to support lightweight Infohabitants. The minimal requirements by an Infohabitant on system resources such as memory and CPU use is very low. One interesting feature is that Infohabitants can temporarily give up their thread when they do not need it. When an external event occurs, e.g. a message arrives, the kernel attempts to give it a thread again so that it can handle the message.

Use of Proxies

Infohabitants do not have a direct reference to their Environment, nor do they have direct references to each other.

The InfohabitantGuardian proxies 105 ensure that their respective associated Infohabitants obey the constraints of the architecture. For instance, an InfohabitantGuardian proxy prevents its Infohabitant 110 from having access to more than one Environment at once, and also maintains its Infohabitant's identity, to ensure that the identity remains fixed throughout the Infohabitant's lifetime. See FIG. 1 for details. Here InfohabitantImp is the implementation of the Infohabitant. Some of its functionality is provided by the kernel (e.g. there is code to ensure that every Infohabitant implements the behaviour shown in FIGS. 6 and 7), but most is specific to the Infohabitant's function and therefore not implemented by the kernel.

TABLE 1

Summary of the components and functionality provided by the InfohabitantGuardian proxy

| Variables/components | Functionality |
| --- | --- |
| Reference to Environment | Provides the Infohabitant access to the basic services provided by the Environment |
| Reference to InfohabitantImp (the actual Infohabitant) | |
| Reference to InfohabitantIdentity | |
| List of Connections | Maintains the Infohabitant's connections |
| Number of available connections | |
| List of Listeners | Maintains a list of Listeners and notifies them when connections are created, rejected and destroyed (optional: Basic resource accounting) |
| Reference to ListenerCookie | |

Table 1 provides some additional detail about the InfohabitantGuardian proxy, also referred to simply as the InfohabitantGuardian, which in accordance with the present invention forms part of a means for communicating of its associated Infohabitant. The functionality it provides is now examined in some more detail. Firstly, an Infohabitant can use its InfohabitantGuardian proxy to access the services provided by the Environment. This is the only way an Infohabitant can access these services. The DIET kernel can therefore easily prevent an Infohabitant from accessing the Environment by disabling its InfohabitantGuardian proxy. This, for instance, happens when the Infohabitant wants to migrate (see "a)" of FIG. 5). Secondly, the InfohabitantGuardian proxy maintains all of its Infohabitant's connections, as well as a value for the number of new connections it is currently allowed to initiate in response to requests from its Infohabitant. This enables an InfohabitantGuardian proxy to check if its associated Infohabitant can create a connection before forwarding the request to the Environment, and furthermore enables the InfohabitantGuardian proxy automatically to destroy all connections when its Infohabitant is removed from the Environment. Thirdly, the InfohabitantGuardian proxy also maintains a list of listeners that it notifies whenever a connection is created, rejected or destroyed. Objects interested in these events can add themselves as a Listener to the InfohabitantGuardian proxy for the Infohabitant they want to observe. One noteworthy feature is that for objects to register as a Listener, they need to provide an additional reference to a ListenerCookie. If their ListenerCookie is not equal to the one maintained by the InfohabitantGuardian, their request is ignored. This mechanism can be used to prevent Infohabitants from adding themselves as a listener. This is necessary, because when Listeners are notified they receive details about the event that need to be hidden from Infohabitants for the system to remain secure. So, in practice, only the debugging and visualisation tools are given the ListenerCookie, but it is hidden from all Infohabitants. Fourthly, in a DIET platform that uses resource accounting, the InfohabitantGuardian is a convenient place to charge every Infohabitant for the services it uses. One advantage is that it hides these details from the Environment whose implementation can therefore be substantially the same for a non-resource accounting and a resource accounting DIET kernel. FIG. 12 shows how all these different functions relate. It shows how the InfohabitantGuardian handles a request to set up a new connection.

When an InfohabitantGuardian receives a connection request from its associated Infohabitant, it first determines if its associated Environment is still hosting its Infohabitant. If its Infohabitant is not still hosted, the InfohabitantGuardian terminates its Infohabitant's Thread. Otherwise, it determines from its internal records if its Infohabitant has the capacity to initiate a further connection, i.e. whether the number of current connections is less than the maximum permitted. If its Infohabitant does not have this capacity, it is notified by the InfohabitantGuardian of the failure of its request. Otherwise, the InfohabitantGuardian makes a request of the associated (hosting) Environment to form a connection between its Infohabitant, also referred to as the requesting Infohabitant or just the requester, and the target Infohabitant, also referred to as just the target.

The hosting Environment then checks that the identity of the requesting Infohabitant and the identity of the target Infohabitant are not equal. If they are equal, the requesting Infohabitant is notified by the hosting Environment of the failure of its request, otherwise the hosting Environment tries to acquire the reference to the InfohabitantGuardian associated with the target Infohabitant. If there is no InfohabitantGuardian associated with the identity of the target Infohabitant, the requesting Infohabitant is similarly notified of the failure of its request. Otherwise, the Environment makes a request of the requester's InfohabitantGuardian to negotiate a connection with the target InfohabitantGuardian.

The requester's InfohabitantGuardian then constructs two ConnectionEnds, one intended for the requester, referred to as the requester ConnectionEnd, and one for the target, referred to as the target ConnectionEnd, and notifies each ConnectionEnd of the identity of the other, reciprocal ConnectionEnd. Finally, it acquires the target Infohabitant from the target's InfohabitantGuardian, and makes a request on the target Infohabitant to accept the target ConnectionEnd. The target ConnectionEnd may be rejected because the target Infohabitant's EventBuffer is full, or because a Thread could not be dynamically allocated to the target Infohabitant or because the target Infohabitant has previously selected to reject all connections. If the target ConnectionEnd is rejected, the requesting Infohabitant is notified of the failure of its request. Otherwise, a ConnectionEvent is pushed into the target Infohabitant's respective EventBuffer, containing a reference to the target ConnectionEnd, an event which will be handled in due course when the target Infohabitant removes that event from its buffer, and the requester ConnectionEnd is returned to the requester, thus completing the successful negotiation of the Connection.

The same procedure is used when the requester identifies the target by its family tag instead of its unique name tag. This time the lookup by family tag returns a list of individuals of the given family tag, and a single Infohabitant (guaranteed to be different from the requester) is chosen from this list.

The ConnectionEnd proxy (also shown in FIG. 1) allows Infohabitants to communicate without directly referencing each other. This offers every Infohabitant basic protection against malicious Infohabitants.

TABLE 2

Summary of the components and functionality provided by the ConnectionEnd proxy

| Variables/components | Functionality |
|---|---|
| Reference to InfohabitantGuardian | |
| Reference to other ConnectionEnd | Provides the Infohabitant with ability to communicate with other Infohabitant |
| Reference to Context | Provides Infohabitant access to Context |
| Flag that controls if connection is enabled | |
| List of Listeners | Maintains a list of Listeners and notifies them when messages are sent, accepted, and rejected. (optional: Basic resource accounting) |
| Reference to ListenerCookie | |

Table 2 provides some additional detail about the ConnectionEnd. It also supports listeners. These listeners receive events when messages are being sent, received, accepted and rejected. Once again, Listeners need to "know" what the ListenerCookie is to register themselves (once again for security, it for instance prevents malicious Infohabitants control over other Infohabitants). FIG. 13 shows how the ConnectionEnd combines several of its functions when it is used to send messages.

Both the InfohabitantGuardian and the ConnectionEnd proxy are dedicated to a single relationship (either between an Infohabitant and its environment, or between two Infohabitants). This has several benefits. Firstly, it enables the kernel to selectively and efficiently disable certain connections or disallow specific Infohabitants access to an environment. Secondly, it can be used to efficiently observe the interactions with specific Infohabitants and their Environment or the interactions between pairs of Infohabitants, using the Listener design pattern as described in Erich Gamma, Richard Helm, Ralph Johnson and John Vlissides. "*Design patterns: Elements of Reusable Object-Oriented Software*", 1995, Addison-Wesley. Thirdly, it also enables Infohabitants to efficiently associate a state (a so-called Context) with each of their connections.

The concept of Proxies is a known design pattern. Use of proxies for access control, dynamic revocation and usage metering is known. IBM Aglets for instance uses proxies for security and location transparency. The MADKit development kit has also been designed such that only the kernel has direct reference to agents. Voyager uses proxies for transparent access to remote objects. Adjanta uses proxies to provide secure access to "resources".

Publications relevant to some of the material mentioned above are as follows: Gutknecht, O & Ferber, J 1997 MadKit: Organising heterogeneity with groups in a platform for multiple multi-agent systems. Technical Report 97188, LIRMM. 161, rue Ada—Montpellier—France, December 1997.

For Aglets, a central reference is a book:
Lange, D. & Oshima, M. 1998 Programming and Deploying Mobile Agents with Java Aglets. Peachpit Press, Berkeley.

The following paper gives an overview of the Aglet API:
Lange, D. & Oshima, M. 1998 Mobile Agents with Java: the Aglet API. World Wide Web Journal.

The following paper refers to Aglets identities, proxies and contexts in the context of security:
Karjoth, G., Lange, D. B. & Oshima, M. 1997 A security model for Aglets. IEEE Internet Computing July-August 1997, 68-77.

Adjanta: the following paper gives an overview of the system:
Karnik, N. M. & Tripathi, A. R. 1998 Agent Server Architecture for the Ajanta Mobile-Agent System. In: Proceedings of 1998 International Conference on Parallel and Distributed Processing Techniques and Applications (PDPTA '98), Las Vegas, July 1998.

and this paper goes into some detail on the use of proxies:
Tripathi, A. & Karnik, N. 1998 Protected resource access for mobile agent-based distributed computing. In: Proceedings of ICPP Workshop on Wireless Networking and Mobile Computing, Minneapolis, August 1998.

The Arc Layer 1805

The Application Reusable Components layer 1805 provides services that are typically useful to applications built on top of the DIET platform. They can be used whenever this is useful, but can be ignored or replaced by alternative implementations.

Above the core layer 1800 the DIET software platform can include a range of components. For instance, these might draw upon ecological and evolutionary inspiration, as well as machine learning and other mechanisms, in order to provide diverse sources of flexibility to facilitate the adaptation of DIET agents to changing circumstances. This layer will also include the elements that support a range of information management and manipulation applications.

The ARC layer 1805 also provides Infohabitants that offer services not directly provided by the DIET kernel. Infohabitants can access these services through their family tags. For example, the ARC layer 1805 defines a CarrierPigeon Infohabitant that can be used to deliver messages to Infohabitants in a different environment and thus provides basic remote communication. Other Infohabitants defined in the ARC layer 1805 can use these CarrierPigeons to offer various more sophisticated ways to communicate remotely.

More precisely, the behaviour of a basic CarrierPigeon is as follows. On creation it is given the address of an Infohabitant (which resides in a different Environment), a respective family tag, and a message. It migrates to the remote Environment, and when this has been successful, it delivers the message to the given Infohabitant. A more sophisticated implementation may wait for a reply, and return this reply to the Infohabitant that created the Infohabitant to send the original message.

The above explanation describes one basic implementation of remote communication. A basic implementation of Multi-cast communication is as follows. When an Infohabitant wants to multi-cast messages, it calls on, or creates via the Environment, a "MultiCast" Infohabitant and provides it with the identities of all target Infohabitants. The MultiCast sends all messages it receives from the former Infohabitant to all other Infohabitants. Any replies are returned to it by the MultiCast, optionally prepended by a unique identifier to distinguish the Infohabitant that sent the reply. Once again, more sophisticated behaviours could be implemented, e.g. a MultiCast Infohabitant could be responsible for several multi-cast relations.

Service Provision by Infohabitant

In DIET systems, many services that are commonly found in the core of known multiagent systems, are provided by Infohabitants instead. Two examples are remote communication (communicating with Infohabitants in different Environments) and multi-cast communication (sending messages to groups of Infohabitants) as described above.

Service Provision: Middleman Infohabitant

Referring to FIGS. 14 and 15, this section describes a simple example of service provision using an Infohabitant implementation called a "MiddleMan" Infohabitant. It illustrates how Contexts can be used effectively. The behaviour of the MiddleMan Infohabitant described here is basic. It allows Infohabitants to communicate indirectly with other Infohabitants. It can, for instance, be used by Infohabitants that want to hide their identity for some reason (e.g. privacy). In this example, the Infohabitant that sets up a connection by way of the MiddleMan is referred to as a Client, whereas the other Infohabitant is referred to as a Server. After a Client has connected to the Middleman, it first sends a message identifying the Server it wants to connect to. The MiddleMan then sets up a connection to the Server. From then on, any message the Client sends to the MiddleMan is directly forwarded to the Server. Similarly, any messages the server sends in reply are passed back to the Client.

FIG. 14 shows how the MiddleMan can implement its behaviour. Whenever it handles a new connection (which by definition is a Client), all it does is associate a MiddleMan specific context with it, which has an empty forwarding address. Whenever it receives a message, it first checks the Context associated with the connection. If the forwarding address is empty, it means it is the first message sent by the Client. It interprets the message and creates a connection to the desired Server (it should be noted that all error handling has been omitted for sake of simplicity). When it has done so, it updates both Contexts. For the Context associated with the connection to the Client, it sets the forwarding address to the newly created connection to the Server. For the Context associated with the connection to the Server, it sets the forwarding address to the connection associated with the Client.

When the forwarding address is non-empty, it means that it is a message which it can forward directly. Without distinguishing if the message is from a Client or a Server, it forwards the message automatically to the appropriate other Infohabitant using the forwarding address. This simple behaviour is sufficient for the MiddleMan to be able to handle multiple Client-Server relationships at once.

FIG. 15 shows an example configuration. Here a single MiddleMan is used for maintaining three Client-Server relationships. Note that two Clients (ClientA and ClientB) communicate with the same Server. This is handled without any problem, as the forwarding address associated with the connection tells to which Client any incoming message needs to go.

The Infohabitants blocks shown in FIG. 15 are Infohabitantimps. The Figure does not show the InfohabitantGuardians (for sake of simplicity).

It is important to realise that the implementation of the MiddleMan does not maintain any reference to its connections. (Its InfohabitantGuardian does, but these cannot be accessed by the MiddleMan's Infohabitantimp.) It does not need to know the Clients and Servers that it is connected to. Whenever it needs to handle a new connection or an incoming message, all it needs to know is stored in the associated Context. In fact, this basic version of the MiddleMan doesn't store any "Infohabitant specific components" (see FIG. 3).

The functionality of the MiddleMan described here is very basic. Typically, it would be more sophisticated. For instance, instead of letting Clients specify the Server directly, they could let the Client describe the properties of the service it requires. The MiddleMan could then try to find a Server that best meets these requirements. In this case, the MiddleMan would typically maintain information about the various Servers it knows of. For each Server it would maintain a few basic properties such as its identity and published capabilities. However, it could also track dynamic properties, such as how quickly the server typically responds. It can easily track these, as all requests from Clients and replies from Servers are handled by the MiddleMan. The table that maintains all this Server specific information would be an example of an Infohabitant specific component.

In the above, the Middleman relies on a Context object. The role of a context object is to help an agent efficiently maintain a 'transaction state' associated with each connection it opens for communication to other agents. The efficiency arises from the way messages are passed from agent to agent. The agent's notification of an incoming message event, or disconnection event on an existing connection, passes a reference to its ConnectionEnd. The ConnectionEnd can be directly used to store and obtain a context object, without the use of tables and the overhead of accessing them. No prescription is made regarding the form of this object, (Context is an empty interface), but agents use the object to 'keep track' of what is happening with a connection. This means that they can rapidly call up a current state from which they know the action required on receiving a message, or which tells them how to tidy up when a connection has been disposed of.

Service Provision: Mirror Infohabitant

An alternative mechanism for providing remote communication between environments uses Mirror Infohabitants. Mirror Infohabitants use CarrierPigeon Infohabitants to transport the actual messages between Infohabitants, but hide as much as possible of the remote communication from the Infohabitants themselves. Thus, as is explained below, an Infohabitant can communicate with Infohabitants in remote environments in the same way as communicating to Infohabitants in its own environment.

In short, every Mirror Infohabitant acts in one environment as a "remote representative" for an Infohabitant in a different environment. All messages that are sent to a Mirror Infohabitant are delivered to the Infohabitant it represents. Any connections that are made to a Mirror Infohabitant result in a connection to the Infohabitant it represents. This involves the automatic creation of another Mirror Infohabitant, which represents the Infohabitant that initiated the connection, and is explained in greater detail in the following example.

An Infohabitant A resides in an Environment 1, and can provide a certain service X which involves receiving query messages from other Infohabitants in the Environment 1, performing the service X, and sending a reply in return. It has a binary family tag, as described above, which identifies it as a Service Provider of the service X to other Infohabitants. For convenience, in this example, the actual binary family tag of the Infohabitant A is represented by the term, ServiceProviderX.

To make its service X available to Infohabitants in an Environment 2, the Infohabitant A creates a mirror of itself, Mirror Infohabitant MA. To do this, the Infohabitant A sends a createInfohabitant request message to its Infohabitant- Guardian proxy 105, containing, inter alia, the type of the requested Infohabitant, Mirror; the identity of the Infohabitant that the newly created mirror is to represent, in this case, A; the identity of the destination environment, the Environment 2; and a Family flag, referred to herein as a specifier, specifying that the newly created mirror is to have the binary family tag of the Infohabitant A, as opposed to a non-specific, all-zero, family tag.

The InfohabitantGuardian responds by sending to the Environment 1, a message containing the information received in the request message.

Upon creation by the Environment 1, the Mirror Infohabitant MA immediately moves to the Environment 2.

Suppose now that an Infohabitant B resides in the Environment 2 and wants to use the service X. To do so, it asks its InfohabitantGuardian for a connection to a Service Provider Infohabitant having a binary family tag, ServiceProviderX. The InfohabitantGuardian sends a request to the Environment 2 for the local identity, i.e. binary name tag, of a local Service Provider Infohabitant for that service X. The Environment 2, which had previously registered the arrival of the Mirror Infohabitant MA as a Service Provider Infohabitant for the service X, responds to that request by sending a reply message to the InfohabitantGuardian for Infohabitant B containing a reference to the InfohabitantGuardian for the Mirror Infohabitant MA. The InfohabitantGuardian for the Infohabitant B now provides that reference to a ConnectionEnd proxy, newly created for this connection, which then requests the InfohabitantGuardian for the Mirror Infohabitant MA to establish a connection between itself and a corresponding ConnectionEnd proxy for the Mirror Infohabitant MA and also newly created for this connection.

In a first embodiment of the present invention, the Mirror Infohabitant MA responds to the establishment of that connection with the Infohabitant B via the newly created ConnectionEnd proxies by requesting the creation of a mirror, Mirror Infohabitant MB, for the Infohabitant B, and specifying that the Mirror Infohabitant MB is to migrate to the Environment 1, i.e. where the creator (Infohabitant A) of the Mirror Infohabitant MA is resident. This is done in an analogous manner to the creation of the Mirror Infohabitant MA, but this time the Family flag specifies that the newly created mirror is to have the non-specific family tag rather than the binary family tag of the Infohabitant B, and the Mirror Infohabitant MA specifies the identity of the Infohabitant that it is representing, namely Infohabitant A. Furthermore, the Mirror Infohabitant MA provides in that request a family tag to be used by the Mirror Infohabitant MB for creating CarrierPigeon Infohabitants for carrying messages to the Mirror Infohabitant MA. This family tag is the same unique family tag that the Mirror Infohabitant MA uses for creating its own CarrierPigeon Infohabitants, referred to hereafter as the MA-specific CarrierPigeon family tag. In this way, as described below, the Mirror Infohabitant MA distinguishes between messages carried by CarrierPigeon Infohabitants from the Mirror Infohabitant MB resident in the Environment 1, and messages that it receives from Infohabitants resident in the Environment 2, i.e. local messages that need to be forwarded from the Environment 2 to the (remote) Environment 1. Similarly, the Mirror Infohabitant MB distinguishes between messages carried by CarrierPigeon Infohabitants from the Mirror Infohabitant MA resident in the Environment 2, and messages that it receives from the Infohabitant A resident in the Environment 1 that need to be forwarded to the Mirror Infohabitant MA resident in the Environment 2.

The Mirror Infohabitant MB is set-up to reject any new connections from Infohabitants that do not have the MA-specific CarrierPigeon family tag. As a result, it will not accept any local messages from Infohabitants other than the Infohabitant A and it will reject any fraudulent CarrierPigeon, i.e. one that does not have the MA-specific CarrierPigeon family tag.

In this embodiment the MA-specific CarrierPigeon family tag was selected and provided to the Mirror Infohabitant MA by the Infohabitant A. In a variant, the Mirror Infohabitant MA generates its own MA-specific CarrierPigeon family tag.

Returning now to the request by the Mirror Infohabitant MA for the creation of a mirror for the Infohabitant B, the Environment 2, upon receipt of that request, creates the Mirror Infohabitant MB, which immediately moves to the Environment 1, and there it establishes a connection via respective ConnectionEnd proxies, as described above, with the Infohabitant A.

When the Infohabitant B sends any subsequent message over the existing connection to the Mirror Infohabitant MA (the Service Provider for the service X), i.e. a message needing to be forwarded to the Mirror Infohabitant MB now resident in the Environment 1, the Mirror Infohabitant MA detects that the family tag of the Infohabitant from which that message was received, i.e. Infohabitant B, is not its own MA-specific CarrierPigeon family tag, and that therefore the message needs to be forwarded to the remote environment of its creator Infohabitant, i.e. the Environment 1.

The Mirror Infohabitant MA responds to receipt of this subsequent message by creating a CarrierPigeon Infohabitant with the MA-specific CarrierPigeon family tag. To do this, the Mirror Infohabitant MA first modifies the message that it received from the Infohabitant B, acting as a client with respect to the Mirror Infohabitant MA, by appending a unique client connection identifier (CCI) which specifies the connection at the Mirror Infohabitant MB that the message needs to be delivered to. The Mirror Infohabitant MA now sends a createInfohabitant message to its InfohabitantGuardian containing, inter alia, the Infohabitant type, CarrierPigeon, the destination address for the newly created CarrierPigeon Infohabitant, i.e. the identity of the Mirror Infohabitant MB, the MA-specific CarrierPigeon family tag, and the modified subsequent message. The InfohabitantGuardian then communicates with its environment, Environment 2, to effect the actual creation of the requested CarrierPigeon Infohabitant, and the newly created CarrierPigeon Infohabitant immediately moves to the Environment 1, establishes a connection with the Mirror Infohabitant MB, delivers the modified subsequent message to the Mirror Infohabitant MB over respective ConnectionEnd proxies, which constitutes indirect delivery of the message to the Infohabitant A, and sends a destroyMe message to the Environment 1. The Mirror Infohabitant MB first strips off the appended CCI, and then forwards the actual subsequent message to the Infohabitant A using the existing connection. This subsequent message can be an initial service request message, or any message in accordance with the particular message set of that service.

Thus it will be appreciated that each Mirror Infohabitant uses the family tag of a connecting CarrierPigeon Infohabitant to distinguish that it is in respect of a message from the remote environment where the Infohabitant it represents resides, as opposed to a local message that needs to be forwarded to that remote environment.

The manner in which Infohabitants detect this family tag will now be described briefly. Whenever a new connection is set up, an Infohabitant is passed the ConnectionEnd proxy corresponding to its side of that specific connection. Similarly, when an Infohabitant is notified of an incoming message, it is not only provided with the message, but also given the ConnectionEnd proxy where it received the message.

Taking the example of the Infohabitant B and the Mirror Infohabitant MA, to obtain the identity of the remote Infohabitant B that has initiated that connection, the Mirror Infohabitant MA invokes a getIdentity() method of the ConnectionEnd proxy, which maintains a reference to the ConnectionEnd proxy at the other end of that connection, which in turn maintains a reference to the InfohabitantGuardian for Infohabitant B, which supplies the identity of the Infohabitant B. As a result of the establishment of that connection, the Mirror Infohabitant MA is now able to send messages to and receive messages from the Infohabitant B.

The Infohabitant A uses the same connection on which it received the subsequent message to send a reply message to the Mirror Infohabitant MB. In like manner, the Mirror Infohabitant MB first modifies the reply message by appending a CCI to specify the connection at the Mirror Infohabitant MA that the message needs to be delivered to, and then creates a CarrierPigeon Infohabitant having the MA-specific CarrierPigeon family tag, which immediately moves to Environment 2, makes a connection with the Mirror Infohabitant MA, delivers to the Mirror Infohabitant MA the modified reply message, and sends a destroyMe message to the Environment 2. The Mirror Infohabitant MA checks the family tag of the received message, recognises that it is its own MA-specific CarrierPigeon family tag and hence that the received message has come from a Mirror Infohabitant that it had created and migrated and therefore needs to be delivered to a local Infohabitant. So, the Mirror Infohabitant MA strips the appended CCI from the received modified reply message, retrieves the CCI, and then forwards the actual reply message to the Infohabitant B by means of that specified existing connection between the Mirror Infohabitant MA and the Infohabitant B.

The use of the CCI to specify the connection at a Mirror Infohabitant that the message needs to be delivered to is important to a Mirror Infohabitant which advertises a service provided by its creator Infohabitant, since there may be many Infohabitants (clients) in its environment which have concurrent connections with that Mirror Infohabitant. For example, further Infohabitants C, D, etc., (not shown) in the Environment 2 may also be sending query messages via the Mirror Infohabitant MA and respective Mirror Infohabitants MC, MD, etc. Thus, when, say the Mirror Infohabitant MC, receives a message from the Infohabitant A, it appends an appropriate CCI to enable the Mirror Infohabitant MA to determine which of its concurrent connections that message is to be delivered to. It will be appreciated that CarrierPigeons from the respective Mirror Infohabitants MC, MD, etc. will all have the same MA-specific CarrierPigeon family tag. It will also be appreciated that each of the respective Mirror Infohabitants MC, MD, etc. has only one local connection, i.e. a connection to the Infohabitant A, so, if desired, the operation of a pair of Mirror Infohabitants, e.g. MA and MB, can be asymmetrical in that the Mirror Infohabitant MA need not append a CCI, since the Mirror Infohabitant MB has only one connection, and does not need a CCI to distinguish between a plurality of connections. However, for convenience, all the Mirror Infohabitants operate in the same manner. In variants, the Mirror Infohabitant MA is responsive to incoming messages from Infohabitants not having its own MA-specific CarrierPigeon family tag, to send the actual message without appending a CCI.

Malicious Infohabitants cannot pretend to be Mirrors created and migrated by the Mirror Infohabitant MA, and send CarrierPigeons to the Mirror Infohabitant MA, because they will not know the MA-specific CarrierPigeon family tag. So, the mirror-to-mirror inter-communication via CarrierPigeons is quite secure.

If the Infohabitant B, after receiving a reply message from the Infohabitant A, decides that it no longer needs the services of the Infohabitant A, it disconnects from the Mirror Infohabitant MA. As there is now no need for the Mirror Infohabitant MB, it can be destroyed. Therefore, when the Infohabitant B disconnects from the Mirror Infohabitant MA, the Mirror Infohabitant MA will create a CarrierPigeon with the MAspecific CarrierPigeon family tag, and a message in the form of a "destroy" command. When the Infohabitant MB receives this message from the CarrierPigeon, it interprets the message and destroys itself. The Environment 1 updates its record of resident Infohabitants and ensures that the connection to the Infohabitant A is disconnected. Similarly, should the Infohabitant A disconnect from a mirror created by its Mirror Infohabitant MA, for example the Mirror Infohabitant MB, the Mirror Infohabitant MB will send a CarrierPigeon to the Mirror Infohabitant MA with a "disconnect" command and a unique identifier for the connection between the Mirror Infohabitant MB and the Mirror Infohabitant MA. On receipt of this message, the Mirror Infohabitant MA will disconnect the connection to the Infohabitant B. It will, however, not necessarily destroy itself, as the Infohabitant A may still want to have its services available to other Infohabitants in Environment 2.

In an alternative embodiment of the present invention, the Mirror Infohabitant MA does not respond to the establishment of that connection with the Infohabitant B via the newly created ConnectionEnd proxies by requesting the creation of a mirror, Mirror Infohabitant MB, for the Infohabitant B. Instead, the Mirror Infohabitant MA waits for the first message from the Infohabitant B, which will be the initial service request message, and then requests the creation of the Mirror Infohabitant MB. This request will contain the initial service request message, which the created Mirror Infohabitant MB will carry in a similar manner to a CarrierPigeon Infohabitant, as described above. The newly created Mirror Infohabitant MB immediately moves (migrates) to the Environment 1, carrying that initial service request message, and there it connects to the Infohabitant A, via respective ConnectionEnd proxies, and forwards that message over the newly created connection to the Infohabitant A, which constitutes direct delivery of the message to the Infohabitant A.

In response to the receipt at the Mirror Infohabitant MA of any subsequent query message from the Infohabitant B over the established connection, the Mirror Infohabitant MA requests the creation of a CarrierPigeon Infohabitant, as described above, for carrying that subsequent message to the Environment 1 and delivering it the Mirror Infohabitant MB, which will forward it to the Infohabitant A.

The above example shows how remote communication is made easy. The Infohabitant A sets up the ability to communicate remotely by creating a Mirror Infohabitant MA. After it has done so, the rest of the remote communication is hidden from the Infohabitants which use the Infohabitant A's service X. The Infohabitant A can treat any remote requests in the same way that it treats requests from Infohabitants in its own environment. Thus, the use of the Mirror Infohabitant MA in Environment 2 enables the Infohabitant B to use the service X without being aware that the service X was actually provided by an Infohabitant in a remote environment.

It will be instructive for the reader to have further details of the use of the nonspecific family tag instead of the binary family tag. When the Mirror Infohabitant MA created the mirror, Mirror Infohabitant MB, no notification was sent to the Infohabitant B. Consequently, the Infohabitant B is unaware of the existence of the Mirror Infohabitant MB, and in the case that the Infohabitant B itself was a service provider for, say, a service Y, the presence in the Environment 1 of the Mirror Infohabitant MB having a binary family tag, ServiceProviderY, would mean that the Infohabitant B was, unknowingly, offering its service Y to Infohabitants in the Environment 1. The use of the non-specific family tag thus prevents the Environment 1 from responding to a request from an Infohabitant for connection to a Service Provider Infohabitant having a binary family tag, ServiceProviderY, by making a connection to the Mirror Infohabitant MB. It will be appreciated that the form of the non-specific family tag is not limited to the all-zeros of this example, but can be any combination of ones and zeros which is not already in use as the binary family tag of a Service Provider Infohabitant.

In a variant of this example, instead of the CarrierPigeon Infohabitant destroying itself after delivering the query message to the Mirror Infohabitant MB in the Environment 1, it starts a timeout and waits for a reply message. When it receives a reply message from the Infohabitant A, or upon expiry of the timeout, it then moves to Environment 2, delivers the reply message, actual or null, to the Mirror Infohabitant MA and then sends a destroyMe message to the Environment 2. In further variants, instead of destroying the CarrierPigeon (a) when it has delivered its message to the Mirror Infohabitant MB or (b) when it has delivered its message (actual or null) to the Mirror Infohabitant MA, depending upon the particular variant as described above, the CarrierPigeon is stored in its current environment and is available for re-use. In a still further variant, when the Infohabitant B terminates the connection to the Mirror Infohabitant MA, the Mirror Infohabitant MA sends a trigger to the CarrierPigeon Infohabitant, which responds by sending a destroyMe message to the Environment 2.

Mirror Infohabitants can be used for remote communication when the specific target Infohabitant in the remote environment is already known. Thus, in an alternative embodiment of the present invention, suppose that an Infohabitant D is a Service Provider for a service Y, i.e. has a ServiceProviderY family tag, that it resides in the Environment 1 and wants to communicate with an Infohabitant E that resides in the Environment 2. To do so, the Infohabitant D creates a Mirror Infohabitant ME in its own environment, i.e. the Environment 1. In the createInfohabitant request it specifies: the type of Infohabitant, Mirror; the address of the Infohabitant it should represent (this is the identity of the Infohabitant, i.e. the name and family tag of Infohabitant E, and the address of the environment where the Infohabitant E resides, i.e. the Environment 2); the environment where the Mirror Infohabitant ME should reside, i.e. the Environment 1; and the Family flag specifying that it should use a nonspecific family tag. This last requirement is because the Infohabitant D is to be the only Infohabitant to use the Mirror Infohabitant ME. Other Infohabitants in the Environment 1 must not accidentally set up a remote connection to the Infohabitant E when they are looking for a Service Provider Y.

When the Environment 1 creates the Mirror Infohabitant ME, it returns the identity of the newly created Infohabitant. The Infohabitant D now uses the returned identity to make a connection to Mirror Infohabitant ME, and in response, the Mirror Infohabitant ME creates a Mirror Infohabitant MD, which migrates to the Environment 2 and makes a connection to the Infohabitant E.

Whereas in the above embodiments, created software units, e.g. Mirror Infohabitants and CarrierPigeons, migrate upon creation, in alternative embodiments created software units do not migrate upon creation but wait until receipt of a migration command specifying a respective destination set, e.g. the Environment 2 in the case of the Mirror Infohabitant MA representing the Service Provider Infohabitant A, and, for a Mirror Infohabitant created by another Mirror Infohabitant, a unit of software of that respective destination set with which that created unit is to establish a connection upon migration to the destination set, e.g. the Infohabitant A in the case of the Mirror Infohabitant MB created by the Mirror Infohabitant MA.

It will be appreciated that in a system of the present invention, for convenience and simplicity all created units of software can have the same, common software migration process, e.g. they migrate upon creation, but depending upon the system design requirements, some created Infohabitants can migrate upon creation, e.g. Mirror Infohabitants, whereas other created Infohabitants, e.g. CarrierPigeons, can migrate upon receipt of a migration command. In variants, Mirror Infohabitants created by Infohabitants, e.g. the Mirror Infohabitant MA, migrate upon creation, whereas Mirror Infohabitants created by other Mirror Infohabitants, e.g. the Mirror Infohabitant MB, migrate upon receipt of a migration command.

In a further alternative embodiment of the present invention, the Mirror Infohabitants themselves do not comprise a software process which is capable of migrating the Mirror Infohabitant from the Environment 1 to the Environment 2, or the reverse direction, as the case may be.

Thus, in this further alternative embodiment, to make its service X available to Infohabitants in an Environment 2, the Infohabitant A creates the mirror of itself, Mirror Infohabitant MA, by sending a createInfohabitant request message to its InfohabitantGuardian proxy 105, containing, inter alia, the type of the requested Infohabitant, RemoteCreationInfohabitant; the type of Infohabitant to be created remotely, Mirror; the identity of the (remote) destination environment where the Infohabitant is to be created, the Environment 2; parameters specifying how to initialise the created (Mirror) Infohabitant. These parameters contain, inter alia, the address of the Infohabitant it represents (the identity of the Infohabitant, i.e. the name tag and family tag of the Infohabitant A, and the identity of the environment where the Infohabitant A resides, i.e. the Environment 1), and a Family flag, referred to herein as a specifier, specifying that the newly created mirror is to have the binary family tag of the Infohabitant A, as opposed to a non-specific, all-zero, family tag.

The Environment 1 now creates a RemoteCreationinfohabitant which immediately moves (migrates) to the Environment 2, creates the requested Mirror Infohabitant MA in the Environment 2, and then destroys itself. This constitutes indirect creation of the Mirror Infohabitant MA upon the request by the Infohabitant A.

In other embodiments, instead of the Mirror Infohabitant MA directly creating the Mirror Infohabitant MB, which then migrates from the Environment 2 to the Environment 1, the Mirror Infohabitant MA indirectly creates the Mirror Infohabitant MB via a createInfohabitant request message, in a similar manner to the above described creation of the Mirror Infohabitant MA by the requested RemoteCreationInfohabitant.

In the above embodiments, the createInfohabitant request includes a type field for containing a type identifier for the type of Infohabitant to be created, and, in addition, a number of parameter fields for containing one or more type-specific parameters which determine how to initialise the Infohabitant upon its creation. In a still further alternative embodiment, in which the createInfohabitant request includes a type field, but has no parameter fields, created Infohabitants receive details on how to initialise themselves, or details defining a specific task to be carried out, by sending them one or more messages after they have been created. As will be readily appreciated by one skilled in the art, this is only an implementation issue and any Infohabitant that has been described can easily be converted to operate in such a still further alternative embodiment.

A Sorting Application Run on the Diet Platform

The DIET platform is geared towards a "bottom-up" software design. This is in the sense that a solution to a problem arises from functionality implemented at the level of the individual Infohabitants, but emerges as a consequence of their collective interaction. (The contrast, "top-down", would be a centralised process sending instructions to Infohabitants which they had to follow in implementing the solution.) The sorting application is an example of this type of behaviour.

This application is built in layer three of the DIET architecture (recall that, from FIG. 18, this layer, the application layer 1810, is where application-specific code is located). It draws upon software components in the ARC layer 1805 and in the core layer 1800.

To install and run an application such as the Sorting application, the following series of events takes place.

The SortingApp constructor first creates a World, then a ThreadPool, then a series of Listeners to observe Events taking place in the World, then passes the World and ThreadPool as parameters to an Environment constructor which creates an Environment. (Capitals are used here to refer to objects instantiated in Java.) This series of events at the start of the call of the SortingApp constructor provides an instantiated ThreadPool which will put limits on the processing capacity the application will use.

Referring to FIG. 18, the application has been designed to arrange Linker Infohabitants 1700 in a sorted sequence. The only two "Infohabitant specific components" for the Linker Infohabitant are references to its two Connections. One Connection to a Linker with a lower identity, and one Connection to a Linker with a higher identity. The Trigger has more "Infohabitant specific components". Most importantly, a variable that controls how long it sleeps. It can also have additional parameters for instance that control how the sleep interval should increase after an attempt to send a message has failed.

The Linker Infohabitants are sorted according to (the binary values of) their identity. All Linkers are passive and only react to incoming messages. Each tries to maintain a connection to two other Linkers: both as close as possible to its own identity but one with a lower identity and one with a higher identity. When a Linker receives a message with the identity of another Linker, it checks if it improves either of its existing links. If it does, it updates the link and sends its own identity to the corresponding Linker. Otherwise it forwards the received identity to the link with an identity closest to it. The sorting process is driven by Trigger Infohabitants. They are active. Every once in a while they randomly select two Linkers and tell one about the other's identity. FIG. 17 shows a screenshot of a visualisation of this application. Individual Linker and Trigger Infohabitants are shown by blocks—lines between them indicate links being formed between Infohabitants.

The application starts of because the Trigger Infohabitants are active. Their behaviour is sufficient to start (and continue) the linking behaviour.

To describe this process in more detail, the steps are as follows.

There are two Triggers, although the number could be changed. A Trigger does not hold knowledge of the identities of all the Linkers at the beginning but it can obtain knowledge of the identities of Linkers. The identities (name tags) have a numerical element and no two identities are the same. Each Trigger selects two Linkers at random and sends one of the selected Linkers the identity of the other selected Linker.

Each Linker looks to see if it has recorded a link to a Linker with a closer identity already. If it has, it retains the recorded link it already has and sends the identity received from the Trigger along this link to the Linker with a closer identity. This secondary Linker repeats the exercise, hence a cascade of messages can arise.

If a Linker finds that the numerical element of the identity sent by the Trigger, or received from another Linker, is closer to it than that of one of the links it has already recorded, it substitutes the new identity as a recorded link and, other than notifying the newly linked Linker of itself and notifying the old Linker of the newly linked Linker because it is likely that both of these Linkers can improve their links, takes no further action, so the cascade dies out.

To start another cascade, the Triggers pick two more Linkers at random and start the process again.

At the beginning, cascades will die out quickly as the Linkers have no, or few, recorded links. As a chain of Linkers builds up, the received identities will get passed further "out" and thus the cascade will take longer to die out.

A variation would be that the Triggers leave non-constant intervals between starting cascades as time goes by.

The Sorting application has a few interesting features. Firstly, although admittedly simple, this local and stochastic algorithm always leads to a perfectly sorted list. Secondly, as sequences get longer, a single trigger action typically results in a larger cascade of messages. Therefore, Triggers have a simple mechanism to adapt their activity to the perceived system load. This simple adaptation strategy means that the system operates close to optimal efficiency despite changing system load. Thirdly, the algorithm is robust. Even when messages get lost or Linker Infohabitants are killed, the algorithm keeps on functioning. Finally, the ability of the kernel to support light-weight Infohabitants means that the application can run on a single computer with many, for instance more than 100,000, Linker Infohabitants which means long sequences can be sorted.

Additional Aspects of the Diet Platform

Adaptability

There are various distinct ways an application can be adapted while running on the DIET platform.

The Infohabitants can control the adaptation of the application. This can be done in various ways. Firstly, individual Infohabitants may adapt their own behaviour. For instance, in the Sorting application described above, the Trigger Infohabitants can decrease their activity when they perceive a high system load. When there are too many cascades of messages occurring between Linkers at once, some message buffers of Linker Infohabitants overflow. When a Trigger Infohabitant tries to send a message to an "overloaded" Linker Infohabitant, the message will be rejected and the Trigger can conclude that the system load is too high and adjust its behaviour accordingly. Alternatively, an Infohabitant can create other Infohabitants when it thinks this is useful. For instance, when an Infohabitant has to reject requests because it cannot handle them fast enough, it may create an Infohabitant similar to itself in an attempt to increase the capacity of queries that can be handled.

Clearly, creating new Infohabitants has the potential to increase memory use and use of processing capacity of the underlying system, which could be detrimental. However, there are two mechanisms for controlling this. Firstly, there is the limit on available threads in the ThreadPool. Secondly, a resource accounting mechanism can be used that charges for all actions so that only successful Infohabitants can pay the cost required to create and maintain an additional Infohabitant. (This is further discussed below.)

The Environment can control adaptation of the application. Again, a resource accounting implementation (briefly mentioned above and further discussed below) is a natural way to achieve this.

The User can control the Infohabitants. One way is to provide a tool, preferably graphical, that allows the user to create, destroy and interact with Infohabitants.

Resource Accounting

The InfohabitantGuardian monitors resources belonging to an Infohabitant. All kernel services provided by the Environment (e.g. setting up a new connection) are passed through the InfohabitantGuardian (see FIG. 1). So for every kernel service that it forwards to the Environment it can subtract resources from the Infohabitant's account. When its resources are not sufficient it can destroy the Infohabitant. In one way of implementing resource accounting, the Infohabitants receive resources when they are created and during their lifetime as a reward for specified actions (from the User, the Environment or from other Infohabitants). In this way unsuccessful Infohabitants are destroyed, whereas successful ones are maintained and possibly create offspring. As a result an evolutionary process can take place within the DIET platform which can help the application to adapt to changing circumstances.

Infohabitant Destruction

Infohabitants cannot normally directly kill other Infohabitants in the DIET platform. The reason is that each Infohabitant has only access to a limited set of objects with limited capabilities. The InfohabitantGuardian and ConnectionEnd proxies shield Infohabitants from direct access to their environment and other Infohabitants. However, when a DIET system is started, it is possible to provide any selected object (e.g. a debugging and visualisation tool) with direct access to the World, and the "ListenerCookie" required for listening to events that take place once the system is running. Any object that has access to the DIET World can then closely examine what happens as well as actually control what happens (i.e. destroy Infohabitants). However, the DIET platform allows the user to control which objects have access to the World, and as long as the user does not explicitly give such access to Infohabitants at installation, the system is secure from Infohabitant destruction for instance via applications in the Application layer 1810.

Unless the context clearly requires otherwise, throughout the description and the claims, the words "comprise", "comprising" and the like are to be construed in an inclusive as opposed to an exclusive or exhaustive sense; that is to say, in the sense of "including, but not limited to".

Any discussion of the prior art throughout the specification should in no way be considered as an admission that such prior art is widely known or forms part of common general knowledge in the field.

What is claimed is:

1. A system for distributed process management comprising a plurality of software units comprising executable computer program code stored in a non-transitory computer-readable storage medium for installation on a computing platform, and further software for controlling the operation of the plurality of software units in use of the system, wherein:

the further software is capable of defining, for each of the computers, a plurality of environments, each environment containing a respective set of said software units and being resident only on its own computer;

each software unit is provided with means adapted for communicating with other software units by the sending and receiving of messages;

at least some of the software units are further provided with means adapted to provide one or more elements of a software process;

each such communicating means includes means storing request handling conditions and is adapted to respond to a request from its own software unit, referred to hereafter as the source unit, for the establishment of a respective connection for a particular communications session between the source unit, and another software unit, referred to hereafter as the target unit, by determining in accordance with the request handling conditions whether it is allowed to handle the request, and if it is so allowed providing to the further software for that respective connection either a complete identity or a family identity for the target unit; and, provided that the further software confirms that the respective environment in which the source unit is resident, currently contains a software unit corresponding to the provided identity, constructing, via the further software, in respect of that respective connection, corresponding source and target ConnectionEnds, each of the ConnectionEnds being provided with the identity of the other of the ConnectionEnds, providing the source unit with the identity of the newly constructed source ConnectionEnd, providing the target unit with the identity of the newly constructed target ConnectionEnds, obtaining, by the source unit's communicating means from the target unit's communicating means, the identity of the target unit, and requesting, by the source unit's communicating means, the target unit to accept the newly constructed target ConnectionEnd, whereby messages from the source unit to the target unit for that particular communications session travel along a path from the source unit to the newly constructed source ConnectionEnd, and then to the newly constructed target ConnectionEnd, and then to the target unit, and in the opposite direction along that path for messages from the target unit to the source unit for that particular communications session;

wherein the corresponding ConnectionEnds are destroyed on cessation of that established communications session.

2. The system according to claim 1, wherein each of said plurality of software units is provided with an event portal having a plurality of buffers each for storing events of a respective type incoming to that software unit from initiating ones of said software units, wherein each buffer has a respective predetermined capacity for storing events and incoming events exceeding that respective capacity result in the generation of respective rejection notifications for the corresponding initiating software units, and wherein the portal is adapted to store an incoming event in the buffer corresponding to its type.

3. The system according to claim 1, wherein the means for communicating of at least one software unit is operative to translate the identity of at least its own software unit so as to hide that identity from a target unit while a connection therebetween is established.

4. The system according to claim 1, wherein the further software defines more than one said set, and wherein communication between a first said software unit, referred to hereafter as the first unit, in a first said set and a second said software unit, referred to hereafter as the second unit, in a second said set is by means of messages sent from the first unit to a said software unit in the first set and representing the second unit, referred to hereafter as the second unit representative, relayed from the second unit representative to a said software unit in the second set and representing the first unit, referred to hereafter as the first unit representative, and forwarded from the first unit representative to the second unit, and with necessary changes having been made for messages sent from the second unit to the first unit.

5. The system according to claim 4, wherein the first unit is capable of (a) requesting the further software to establish the first unit representative in the second set by creating the first unit representative initially in the first set, the first unit representative so created comprising a software process which is capable of migrating that unit from said first set to a specified said set, and (b) specifying that the first unit representative so created is to migrate to the second set.

6. The system according to claim 5, wherein the first unit representative is capable of (a) requesting the further software to establish the second unit representative in the first set by creating the second unit representative initially in the second set, the second unit representative so created comprising a software process which is capable of migrating that unit from said second set to a specified said set, and (b) specifying that the second unit representative so created is to migrate to the first set, and wherein the second unit representative is capable, when resident in the first set, of establishing a connection to the first unit.

7. The system according to claim 5, wherein the first unit representative is capable of (a) requesting the further software to establish the second unit representative in the first set by creating a said software unit in the second set, the software unit so created comprising a software process which is capable of migrating that unit to a specified said set, and (b) specifying that the software unit so created is to migrate to the first set, and, when resident in the first set, is to create the second unit representative, and wherein the second unit representative is capable of establishing a connection to the first unit.

8. The system according to claim 5, wherein:
in each said set the software units have unique local identities, and
the local identity of said first unit includes a specific family identifier identifying a function to be provided by said first unit for other software units of said first set; and said further software is capable of creating said first unit representative such as to have either said specific family identifier or a non-specific family identifier in accordance with a specifier in said request by said first unit in dependence upon whether or not said function is to be made available to software units of said second set.

9. The system according to claim 5, wherein:
the first unit is capable of (a) requesting the further software to establish the first unit representative in the second set by creating a said software unit in the first set and (b) specifying that the software unit so created is to be the second unit representative, and that the second unit representative so created is to be capable of requesting the further software to establish the first unit representative in the second set;
the second unit representative so created is capable of requesting the further software to establish the first unit representative in the second set by creating the first unit representative initially in the first set, and wherein the first unit representative so created comprises a software process which is capable of migrating that unit from said first set to a specified said set, and wherein the first unit specifies that the first unit representative so created is to migrate to the second set, and wherein the first unit representative is capable, when resident in the second set, of establishing a connection to the second unit; and
the software process which is capable of migrating its unit to a specified set is arranged to migrate that created unit upon its creation.

10. The system according to claim 5 wherein:
the first unit is capable of (a) requesting the further software to establish the first unit representative in the second set by creating a said software unit in the first set and (b) specifying that the software unit so created is to be the second unit representative, and that the second unit representative so created is to be capable of requesting the further software to establish the first unit representative in the second set;
the second unit representative so created is capable of requesting the further software to establish the first unit representative in the second set by creating the first unit representative initially in the first set, and wherein the first unit representative so created comprises a software process which is capable of migrating that unit from said first set to a specified said set, and wherein the first unit specifies that the first unit representative so created is to migrate to the second set, and wherein the first unit representative is capable, when resident in the second set, of establishing a connection to the second unit; and
the software process which is capable of migrating its unit to a specified set is arranged to migrate that created unit upon receipt of a migration command.

11. The system according to claim 5, wherein at least one ConnectionEnd of said corresponding source and target ConnectionEnds has a reference to a transaction state.

12. The system according to claim 4, wherein the first unit is capable of (a) requesting the further software to establish the first unit representative in the second set by creating a said software unit in the first set, the software unit so created comprising a said migrating process which is capable of migrating that unit to a specified said set, and (b) specifying that the software unit so created is to migrate to the second set and, when resident in the second set, is to create the first unit representative.

13. The system according to claim 4, wherein the first unit is capable of (a) requesting the further software to establish the first unit representative in the second set by creating a said software unit in the first set and (b) specifying that the software unit so created is to be the second unit representative, and that the second unit representative so created is to be capable of requesting the further software to establish the first unit representative in the second set.

14. The system according to claim 13, wherein the second unit representative so created is capable of requesting the further software to establish the first unit representative in the second set by creating the first unit representative initially in the first set, and wherein the first unit representative so created comprises a software process which is capable of migrating that unit from said first set to a specified said set, and wherein the first unit representative so created specifies that the first unit representative so created is to migrate to the second set, and wherein the first unit representative is capable, when resident in the second set, of establishing a connection to the second unit.

15. The system according to claim 13, wherein the second unit representative so created is capable of (a) requesting the further software to establish the first unit representative in the second set by creating a said software unit in the first set, the software unit so created comprising a software process which is capable of migrating that unit to a specified said set, and (b) specifying that the software unit so created is to migrate to the second set and, when resident in the second set, is to create the first unit representative, and wherein the first unit representative is capable of establishing a connection to the second unit.

16. The system according to claim 13, wherein:
in each said set the software units have unique identities, and
the local identity of said second unit includes a specific family identifier identifying a function to be provided by said second unit for other software units of said second set; and said further software is capable of creating said second unit representative such as to have either said specific family identifier or a non-specific family identifier in accordance with a specifier in said request by said first unit in dependence upon whether or not said function is to be made available to software units of said first set.

17. The system according to claim 1, wherein the request handling conditions include a maximum for the number of current connections that the source unit is allowed to have.

18. The system according to claim 1, wherein each of the newly constructed source and target ConnectionEnds include means storing state information relating to the respective connection for that particular communications session, and each of the source and target units is adapted to respond to receipt of a message of that particular connection by retrieving from its ConnectionEnd the stored state information and determining therefrom a required action.

19. A computing platform installed in a computing environment including at least one computer to support the running of a software process by use of processing and data storage capacity of the computing environment, the platform having installed thereon a system according to claim 1, and comprising means for creating said software units, and software support means for maintaining a plurality of units of processing capacity of the computing environment for allocation to selected software units during running of a said software process.

20. The platform according to claim 19 wherein each software unit has an associated resource account mechanism which subtracts resources from the account when the software unit makes requests of the further software and adds resources to the account when the software unit performs specified actions successfully.

21. An applications platform installed in a computing environment including at least one computer to support the running of an application by use of processing and data storage capacity of the computing environment, the installed platform comprising:
means to create a first community of software units; and
means to provide a support software environment to the first community,
wherein an application to be run on the platform is installed as processes of a selected plurality of the first community of software units, and processes for support of the application in use are themselves installed on further software units of the first community;
wherein a first unit maintained in the first community is capable of (a) requesting the further software to establish the first unit representative in a second community of units by creating the first unit representative initially in the first community, the first unit representative so created comprising a software process which is capable of migrating that unit from said first community to a specified other community and (b) specifying that the first unit representative so created is to migrate to the second community while also leaving said first unit to be maintained in said first community,
wherein, similarly, a second unit maintained in the second community is capable of (a) requesting the further software to establish a second unit representative in the first community of units by creating the second unit representative initially in the second community, the second unit representative so created comprising a software process which is capable of migrating that unit from said second community to a specified other community and (b) specifying that the second unit representative so created is to migrate to the first community while also leaving said second unit to be maintained in said second community,
wherein a respective connection for a particular communications session between the first unit and the second unit is established by the creation of a pair of Connection-Ends in the first community for communications between the first unit and the second unit representative, and a pair of ConnectionEnds in the second community for communications between the second unit and the first unit representative, and the creation of respective carrier units which transport messages between the unit representatives, and
wherein the means to provide a support software environment to the community maintains a plurality of units of processing capacity of the computing environment for allocation to selected units of the community of software units during running of an application.

22. The platform according to claim 21, wherein the number of units of processing capacity is less than the number of software units in the community.

23. The platform according to claim 21, wherein said plurality has a maximum number which is determined when an application is first started.

24. The platform according to claim 21, wherein each software unit is arranged such that, regardless of whether or not it is currently allocated a unit of processing capacity of the computing environment, communication therewith can be initiated by another software unit.

25. The platform according to claim 24, wherein each software unit is provided with means to maintain state information in relation to a communication with another software unit and each software unit maintains that state information whether or not it is currently allocated a unit of processing capacity of the computing environment.

26. The platform according to claim 25, wherein each said software unit includes at least one dedicated software unit maintains at least one element of data relevant to its associated software unit.

27. The platform according to claim 26, wherein one element of data maintained by a dedicated software unit is the state information in relation to a communication with another software unit.

28. The platform according to claim 26, wherein one element of data maintained by a dedicated software unit provides a measure of success of the software unit to which it is dedicated, said measure of success being a factor in replication or destruction of the software unit such that the community is capable of adaptation.

29. The platform according to claim 25, wherein if an event requires that a software unit be allocated a unit of processing capacity and that software unit is not currently allocated a unit of processing capacity, the computing environment will automatically allocate that software unit an available unit of processing capacity.

30. The platform according to claim 25, wherein if an event requires that a software unit be allocated a unit of processing capacity, that software unit is not currently allocated a unit of processing capacity, and the computing environment does not have a unit of processing capacity available for allocation, that event is rejected by the software unit.

31. The platform according to claim 25, wherein the support software environment is further adapted to support destruction of software units of the community.

32. The platform according to claim 21, wherein each software unit in a community is provided with a portal provided with means to store event data in relation to events yet to be processed by the software unit.

33. The platform according to claim 32, wherein said event data includes a count of events yet to be processed.

34. The platform according to claim 33, wherein the portal maintains a maximum in relation to the count of events yet to be processed, any incoming event being rejected once the count has reached its maximum.

35. The platform according to claim 34, wherein the portal maintains multiple counts of events in different type categories, and a maximum for each of said multiple counts.

36. A system for distributed process management comprising a plurality of software units comprising executable computer program code stored in a non-transitory computer-readable storage medium for installation on a computing platform comprising a plurality of interconnected computers, and further software for controlling the operation of the software units in use of the system, wherein:

the further software is capable of defining, for each of the computers, a plurality of environments, each environment containing a respective set of said software units and being resident only on its own computer;

each software unit is provided with means adapted for communicating with other software units by the sending and receiving of messages;

at least some of the software units are further provided with means adapted to provide one or more elements of a software process;

each such communicating means includes means storing request handling conditions and is adapted to respond to a request from its own software unit, referred to hereafter as the source unit, for the establishment of a respective connection for a particular communications session between the source unit, and another software unit, referred to hereafter as the target unit, by determining in accordance with the request handling conditions whether it is allowed to handle the request, and if it is so allowed providing to the further software for that respective connection either a complete identity or a family identity for the target unit; and, provided that the further software confirms that the respective software environment in which the source unit is resident, currently contains a software unit corresponding to the provided identity, constructing, via the further software, in respect of that respective connection, corresponding source and target ConnectionEnds, each of the ConnectionEnds being provided with the identity of the other of the ConnectionEnds, and providing the source unit with the identity of the newly constructed source ConnectionEnd and providing the target unit with the identity of the newly constructed target ConnectionEnd whereby messages from the source unit to the target unit for that particular communications session travel along a path from the source unit to the newly constructed source ConnectionEnd, and then to the newly constructed target ConnectionEnd, and then to the target unit, and in the opposite direction along that path for messages from the target unit to the source unit for that particular communications session;

wherein the corresponding ConnectionEnds are destroyed on cessation of that established communications session;

wherein the further software defines more than one said set, and wherein communication between a first said software unit, referred to hereafter as the first unit, in a first said set and a second said software unit, referred to hereafter as the second unit, in a second said set is by means of messages sent from the first unit to a said software unit in the first set and representing the second unit, referred to hereafter as the second unit representative, relayed from the second unit representative to a said software unit in the second set and representing the first unit, referred to hereafter as the first unit representative, and forwarded from the first unit representative to the second unit, and with necessary changes having been made for messages sent from the second unit to the first unit;

wherein the first unit is capable of (a) requesting the further software to establish the first unit representative in the second set by creating the first unit representative initially in the first set, the first unit representative so created comprising a software process which is capable of migrating that unit from said first set to a specified said set, and (b) specifying that the first unit representative so created is to migrate to the second set; and wherein in each said set the units of software have unique local identities and the first unit representative is capable of (a) requesting the further software to establish the second unit representative in the first set by creating the second unit representative initially in the second set, the second unit representative so created comprising a software process which is capable of migrating that unit from said second set to a specified said set, and (b) specifying that the second unit representative so created is to migrate to the first set, and wherein the second unit representative is capable, when resident in the first set, of establishing a connection to the first unit, and the local identity of said second unit includes a specific family identifier identifying a function to be provided by said second unit for other software units of said second set; and said further software is capable of creating said second unit representative such as to have either said specific family identifier or a non-specific family identifier in accordance with a specifier in said request by said first unit representative in dependence upon whether or not said function is to be made available to software units of said first set.

37. The system according to claim 36, wherein the first unit is capable of (a) requesting the further software to establish the first unit representative in the second set by creating a said software unit in the first set and (b) specifying that the software unit so created is to be the second unit representative, and that the second unit representative so created is to be capable of requesting the further software to establish the first unit representative in the second set.

38. The system according to claim 36, wherein the second unit representative so created is capable of requesting the further software to establish the first unit representative in the second set by creating the first unit representative initially in the first set, and wherein the first unit representative so created comprises a software process which is capable of migrating that unit from said first set to a specified said set, and wherein the first unit specifies that the first unit representative so created is to migrate to the second set, and wherein the first unit representative is capable, when resident in the second set, of establishing a connection to the second unit.

39. The system according to claim 36, wherein the second unit representative so created is capable of (a) requesting the further software to establish the first unit representative in the second set by creating a said software unit in the first set, the software unit so created comprising a software process which is capable of migrating that unit to a specified said set, and (b) specifying that the software unit so created is to migrate to the second set and, when resident in the second set, is to create the first unit representative, and wherein the first unit representative is capable of establishing a connection to the second unit.

40. The system according to claim 36, wherein:
in each said set the software units have unique local identities, and
the local identity of said first unit includes a specific family identifier identifying a function to be provided by said first unit for other software units of said first set; and said further software is capable of creating said first unit representative such as to have either said specific family identifier or a non-specific family identifier in accordance with a specifier in said request by said first unit in dependence upon whether or not said function is to be made available to software units of said second set.

41. A system for distributed process management comprising a plurality of software units comprising executable computer program code stored in a non-transitory computer-readable storage medium for installation on a computing platform comprising a plurality of interconnected computers, and further software for controlling the operation of the software units in use of the system, wherein:
the further software is capable of defining, for each of the computers, a plurality of environments, each environment containing a respective set of said software units and being resident only on its own computer;
each software unit is provided with means adapted for communicating with other software units by the sending and receiving of messages;
at least some of the software units are further provided with means adapted to provide one or more elements of a software process;
each such communicating means includes means storing request handling conditions and is adapted to respond to a request from its own software unit, referred to hereafter as the source unit, for the establishment of a respective connection for a particular communications session between the source unit, and another software unit, referred to hereafter as the target unit, by
determining in accordance with the request handling conditions whether it is allowed to handle the request, and if it is so allowed providing to the further software for that respective connection either a complete identity or a family identity for the target unit; and, provided that the further software confirms that the respective software environment in which the source unit is resident, currently contains a software unit corresponding to the provided identity,
constructing, via the further software, in respect of that respective connection, corresponding source and target ConnectionEnds, each of the ConnectionEnds being provided with the identity of the other of the ConnectionEnds, and
providing the source unit with the identity of the newly constructed source ConnectionEnd and providing the target unit with the identity of the newly constructed target ConnectionEnd whereby messages from the source unit to the target unit for that particular communications session travel along a path from the source unit to the newly constructed source ConnectionEnd, and then to the newly constructed target ConnectionEnd, and then to the target unit, and in the opposite direction along that path for messages from the target unit to the source unit for that particular communications session;
wherein the corresponding ConnectionEnds are destroyed on cessation of that established communications session;
wherein the further software defines more than one said set, and wherein communication between a first said software unit, referred to hereafter as the first unit, in a first said set and a second said software unit, referred to hereafter as the second unit, in a second said set is by means of messages sent from the first unit to a said software unit in the first set and representing the second unit, referred to hereafter as the second unit representative, relayed from the second unit representative to a said software unit in the second set and representing the first unit, referred to hereafter as the first unit representative, and forwarded from the first unit representative to the second unit, and with necessary changes having been made for messages sent from the second unit to the first unit;
wherein the first unit is capable of (a) requesting the further software to establish the first unit representative in the second set by creating the first unit representative initially in the first set, the first unit representative so created comprising a software process which is capable of migrating that unit from said first set to a specified said set, and (b) specifying that the first unit representative so created is to migrate to the second set; and
wherein each of said unit representatives is capable of (a) requesting the further software to create a software unit, referred to hereafter as a carrier unit, the said carrier unit so created being capable of carrying a said message and comprising a software process which is capable of migrating that unit to a specified said set, and (b) specifying that the carrier unit so created is to migrate to the set of the other of said unit representatives, connect to the other of said unit representatives and deliver the carried message.

42. The system according to claim 41, wherein a said carrier unit is capable of reuse for carrying a message in the reverse direction.

43. A system for distributed process management comprising a plurality of software units comprising executable computer program code stored in a non-transitory computer-readable storage medium for installation on a computing platform comprising a plurality of interconnected computers, and further software for controlling the operation of the software units in use of the system, wherein:

the further software is capable of defining, for each of the computers, a plurality of environments, each environment containing a respective set of said software units and being resident only on its own computer;

each software unit is provided with means adapted for communicating with other software units by the sending and receiving of messages;

at least some of the software units are further provided with means adapted to provide one or more elements of a software process;

each such communicating means includes means storing request handling conditions and is adapted to respond to a request from its own software unit, referred to hereafter as the source unit, for the establishment of a respective connection for a particular communications session between the source unit, and another software unit, referred to hereafter as the target unit, by determining in accordance with the request handling conditions whether it is allowed to handle the request, and if it is so allowed providing to the further software for that respective connection either a complete identity or a family identity for the target unit; and, provided that the further software confirms that the respective software environment in which the source unit is resident, currently contains a software unit corresponding to the provided identity, constructing, via the further software, in respect of that respective connection, corresponding source and target ConnectionEnds, each of the ConnectionEnds being provided with the identity of the other of the ConnectionEnds, and providing the source unit with the identity of the newly constructed source ConnectionEnd and providing the target unit with the identity of the newly constructed target ConnectionEnd whereby messages from the source unit to the target unit for that particular communications session travel along a path from the source unit to the newly constructed source ConnectionEnd, and then to the newly constructed target ConnectionEnd, and then to the target unit, and in the opposite direction along that path for messages from the target unit to the source unit for that particular communications session;

wherein the corresponding ConnectionEnds are destroyed on cessation of that established communications session;

wherein the further software defines more than one said set, and wherein communication between a first said software unit, referred to hereafter as the first unit, in a first said set and a second said software unit, referred to hereafter as the second unit, in a second said set is by means of messages sent from the first unit to a said software unit in the first set and representing the second unit, referred to hereafter as the second unit representative, relayed from the second unit representative to a said software unit in the second set and representing the first unit, referred to hereafter as the first unit representative, and forwarded from the first unit representative to the second unit, and with necessary changes having been made for messages sent from the second unit to the first unit;

wherein the first unit is capable of (a) requesting the further software to establish the first unit representative in the second set by creating the first unit representative initially in the first set, the first unit representative so created comprising a software process which is capable of migrating that unit from said first set to a specified said set, and (b) specifying that the first unit representative so created is to migrate to the second set;

wherein the first unit representative is capable of (a) requesting the further software to establish the second unit representative in the first set by creating the second unit representative initially in the second set, the second unit representative so created comprising a software process which is capable of migrating that unit from said second set to a specified said set, and (b) specifying that the second unit representative so created is to migrate to the first set, and wherein the second unit representative is capable, when resident in the first set, of establishing a connection to the first unit;

wherein each of said unit representatives is capable of (a) requesting the further software to create a software unit, referred to hereafter as a carrier unit, the said carrier unit so created being capable of carrying a said message and comprising a software process which is capable of migrating that unit to a specified said set, and (b) specifying that the carrier unit so created is to migrate to the set of the other of said unit representatives, connect to the other of said unit representatives and deliver the carried message, and wherein a said unit representative, so created and capable of requesting the further software to establish the other of said unit representatives, is further capable of (a) requesting the further software to create directly or indirectly said other of said unit representatives to be capable of requesting the further software to create the said carrier unit to have an identifier specific to the said unit representative, and of (b) requesting the further software to create a said carrier unit to have said specific identifier, and wherein each of said unit representatives is capable of determining the future handling of a message received via a carrier unit in dependence upon whether or not that carrier unit has said specific identifier.

44. The system according to claim 43, wherein the first unit is capable of (a) requesting the further software to establish the first unit representative in the second set by creating a said software unit in the first set, the software unit so created comprising a said migrating process which is capable of migrating that unit to a specified said set, and (b) specifying that the software unit so created is to migrate to the second set and, when resident in the second set, is to create the first unit representative.

* * * * *